(12) United States Patent
Wu

(10) Patent No.: US 11,641,024 B2
(45) Date of Patent: *May 2, 2023

(54) ELECTRONIC DEVICE

(71) Applicant: Chun-Hung Wu, New Taipei (TW)

(72) Inventor: Chun-Hung Wu, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,111

(22) Filed: Mar. 25, 2022

(65) Prior Publication Data

US 2022/0216576 A1 Jul. 7, 2022

Related U.S. Application Data

(60) Continuation of application No. 16/838,247, filed on Apr. 2, 2020, now Pat. No. 11,316,234, which is a
(Continued)

(30) Foreign Application Priority Data

Oct. 4, 2013 (TW) .................................. 102218670

(51) Int. Cl.
*H01M 50/543* (2021.01)
*H01M 50/502* (2021.01)
(Continued)

(52) U.S. Cl.
CPC ..... *H01M 10/0436* (2013.01); *H01M 50/107* (2021.01); *H01M 50/24* (2021.01);
(Continued)

(58) Field of Classification Search
CPC .. H01M 50/543; H01M 50/24; H01M 50/107; H01M 50/502; H01M 50/213;
(Continued)

(56) References Cited

U.S. PATENT DOCUMENTS

2002/0006544 A1 1/2002 Asaka et al.
2011/0065019 A1 3/2011 Taniguchi

FOREIGN PATENT DOCUMENTS

CN 201022087 Y 2/2008
CN 101290999 A 10/2008
(Continued)

OTHER PUBLICATIONS

Office Action dated May 24, 2016 issued in corresponding Chinese Application No. 201410474420.3, 5 pages.

*Primary Examiner* — James Lee
(74) *Attorney, Agent, or Firm* — Muncy, Geissler, Olds & Lowe, P.C.

(57) ABSTRACT

An electronic device includes a device body and a female terminal structure connected to the device body. The female terminal structure includes a female terminal body, a tunnel, a second terminal member, and a secured terminal member. The female terminal body is connected to the device body and a mating electronic device, respectively. The tunnel is recessed from the female terminal body. The second terminal member is disposed at the female terminal body and received in the tunnel. The second terminal member has a terminal inserting portion. The secured terminal member is disposed at the female terminal body, spaced from the second terminal member, and disposed on an outer periphery of the extension portion. The extension portion is substantially flushed with the secured terminal member. The second terminal member is not flushed with the extension portion. The second terminal member is enclosed by the extension portion.

8 Claims, 19 Drawing Sheets

Related U.S. Application Data division of application No. 15/708,627, filed on Sep. 19, 2017, now Pat. No. 10,700,337, which is a continuation of application No. 14/149,239, filed on Jan. 7, 2014, now Pat. No. 9,812,691.

(51) Int. Cl.
*H01M 10/04* (2006.01)
*H01R 11/28* (2006.01)
*H01M 50/24* (2021.01)
*H01M 50/107* (2021.01)
*H01M 50/559* (2021.01)
*H01M 50/548* (2021.01)
*H01M 50/514* (2021.01)
*H01M 50/213* (2021.01)

(52) U.S. Cl.
CPC ....... *H01M 50/514* (2021.01); *H01M 50/548* (2021.01); *H01M 50/559* (2021.01); *H01R 11/288* (2013.01); *H01M 50/213* (2021.01); *H01M 2220/30* (2013.01)

(58) Field of Classification Search
CPC ............. H01M 50/20; H01M 10/0436; H01M 2220/30; H01R 11/28
See application file for complete search history.

(56) References Cited

FOREIGN PATENT DOCUMENTS

| | | |
|---|---|---|
| CN | 103069627 A | 4/2013 |
| EP | 2296212 A1 | 3/2011 |
| JP | 2009/188095 A | 8/2009 |

ELECTRONIC DEVICE

CROSS-REFERENCES TO RELATED APPLICATIONS

This application is a Continuation Application of application Ser. No. 16/838,247 filed in United States on Apr. 2, 2020, which is a Division of Application of application Ser. No. 15/708,627, which is a Continuation Application of application Ser. No. 14/149,239. The prior applications are herewith incorporated by reference in its entirety.

BACKGROUND

Technical Field

The disclosure relates to a battery module, and particularly to a continuable power module in which the number of the batteries thereof can be increased or reduced according to user's requirements.

Related Art

Due to the invention of batteries, the power of electric appliances is no longer dependent on the supply mains, such that the electric appliances can be operated in different occasions and environments, thereby significantly increasing the usefulness of the electric appliances.

However, even batteries with the same voltage may be of different sizes and/or shapes, so that the user finds it difficult to choose the proper battery for their device. For instance, for two electric razors operating at 6 volts, the batteries used might be different due to the difference between the brands or the receiving spaces for the batteries.

In addition, the voltage requirements for different electric appliances may not be the same, and the voltage provided by a single battery is fixed, such that several batteries are connected to each other in a head-to-tail manner firstly to meet the operation voltage of the electric appliance, and then the connected batteries are connected electrically to the electric appliance. In view of this, since there is no structure for fastening one battery with another, a battery receiving groove with enough structural strength is essential for the electric appliance, so that the batteries received and positioned within the electric appliance can be connected electrically to each other and drive the electric appliance.

Additionally, the batteries are separated from outer circumstances via the battery receiving groove, such that water or dust will not make influence to the electrical connections of the batteries; conversely, when the batteries are not received in the battery receiving groove, there is no any waterproof or dustproof design for the electrical connections of the batteries.

SUMMARY

In view of this, one embodiment of the disclosure provides an electronic device adapted to be connected to a mating electronic device having a male terminal structure. The male terminal structure has a first terminal member and a free terminal member. The electronic device comprises a device body and a female terminal structure. The female terminal structure is connected to the device body and comprises a female terminal body, an extension portion, a tunnel, a second terminal member, and a secured terminal member. The female terminal body is connected to the device body and the mating electronic device, respectively. The extension portion is protruding from a middle portion of the female terminal body. The tunnel is recessed from a middle portion of the extension portion. The second terminal member is disposed at an end portion of the female terminal body and received in the tunnel. The second terminal member has a terminal inserting portion capable of receiving the first terminal member. The secured terminal member is disposed at the end portion of the female terminal body, spaced from the second terminal member, and disposed on an outer periphery of the extension portion. The secured terminal member is capable of being in contact with the free terminal member. An end portion of the extension portion is substantially flushed with an end portion of the secured terminal member. The second terminal member is separated from the secured terminal member by the extension portion. An end portion of the second terminal member is not flushed with the end portion of the extension portion. The second terminal member is enclosed by the extension portion. On end of the tunnel is closed.

In one embodiment, the female terminal structure further comprises a limiting portion, a void, and a surrounding groove. The limiting portion is protruding from the middle portion of the female terminal body. The void is in a middle portion of the limiting portion, and the extension portion is located in the void. The surrounding groove is between an inner wall of the limiting portion and an outer wall of the extension portion. The limiting portion is capable of being mated with a positioning portion of the mating electronic device, and the surrounding groove is capable of receiving the free terminal member. One end of the void is closed.

In one embodiment, the female terminal structure further comprises a positioning portion and a peripheral groove. The positioning portion is recessed at the middle portion of the female terminal body, and the extension portion is located in the positioning portion. The peripheral groove is between an inner wall of the positioning portion and an outer wall of the extension portion. The positioning portion is capable of being mated with a limiting portion of the mating electronic device, and the peripheral groove is capable of receiving the free terminal member.

In one embodiment, the extension portion an insulating member disposed between the second terminal member and the secured terminal member.

In one embodiment, the female terminal structure further comprises a waterproof elastomer disposed in the tunnel of the extension portion, so that the second terminal member is normally shielded by the waterproof elastomer, wherein the waterproof elastomer has a channel, wherein the terminal inserting portion is capable of receiving the first terminal member through the channel of the waterproof elastomer, and an inner wall of the channel of the waterproof elastomer is capable of enclosing an outer wall of the first terminal member.

In one embodiment, the second terminal member further comprises an abutting wall extending from the terminal inserting portion, the abutting portion has a receiving space, and the waterproof elastomer is located in the receiving space and in contact with the abutting wall.

In one embodiment, the female terminal structure further comprises a flexible compressible member fitted over the secured terminal member, so that the secured terminal member is normally shielded by the flexible compressible member, wherein the flexible compressible member is capable of being compressed inwardly by the free terminal member, so that the secured terminal member is exposed and is capable of being in contact with the free terminal member.

In one embodiment, a bottom surface of the terminal insertion portion is a curved surface.

In one embodiment, a space within the receiving space is greater than a space within the terminal inserting portion.

According to the disclosure, the electronic devices (e.g., batteries) having the terminal assembly are capable of being connected with each other in a fast and efficient manner. Furthermore, the battery of continuable power module can be connected to each other, and the number of the batteries of the continuable power module can be altered so as to adjust the outputted voltage to match with the operating voltage of the electric appliance. Additionally, the continuable power module is waterproofed, so that the electric appliances applied thereto can be operated under water or on rainy days, thereby enhancing the usefulness of the electric appliances. Furthermore, via the application of the spindle body, the continuable power module is bendable, twistable and foldable, so that the continuable power module can be even received in irregular and small spaces.

The detailed features and advantages of the disclosure are described below in great detail through the following embodiments, the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
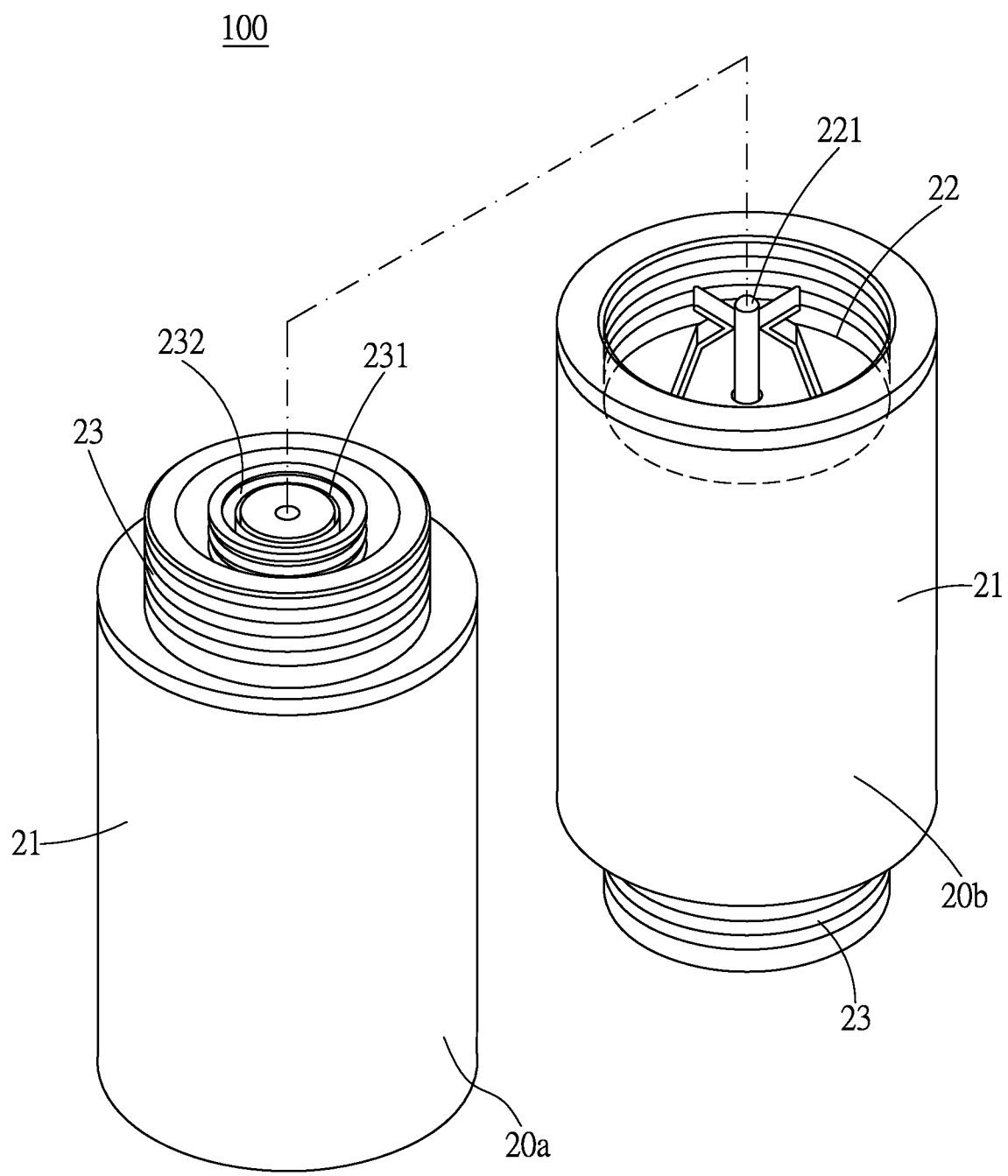
FIG. 1 is a perspective view of a continuable power module of a first embodiment of the disclosure.

Hereinafter, for convenience, the term "electric device" is substantially the same as the term "electronic device"; and the term "electric appliance" is substantially the same as the term "electronic appliance".

Please refer to FIGS. 1-4, which are a perspective view, a partial enlarged view, partial cross-sectional views of a continuable power module 100, operating schematic views of a waterproof elastomer 32 thereof, and an operating schematic view of the continuable power module 100, of a first embodiment of the disclosure. The continuable power module 100 includes at least one battery 20 capable of being received in a battery receiving groove of an electric appliance so as to offer electricity for the electric appliance. Additionally, the operating voltages for different electric appliances would not be the same, so that the number of the batteries 20 for operating the electric appliances is adjustable case by case. Hereinafter, for ease of reading and recognition, battery 20 is the generic term of battery 20a and battery 20b; that is, although some figures and some paragraphs only mention about battery 20a, it is also applicable for battery 20b and battery 20.

Figure 2:
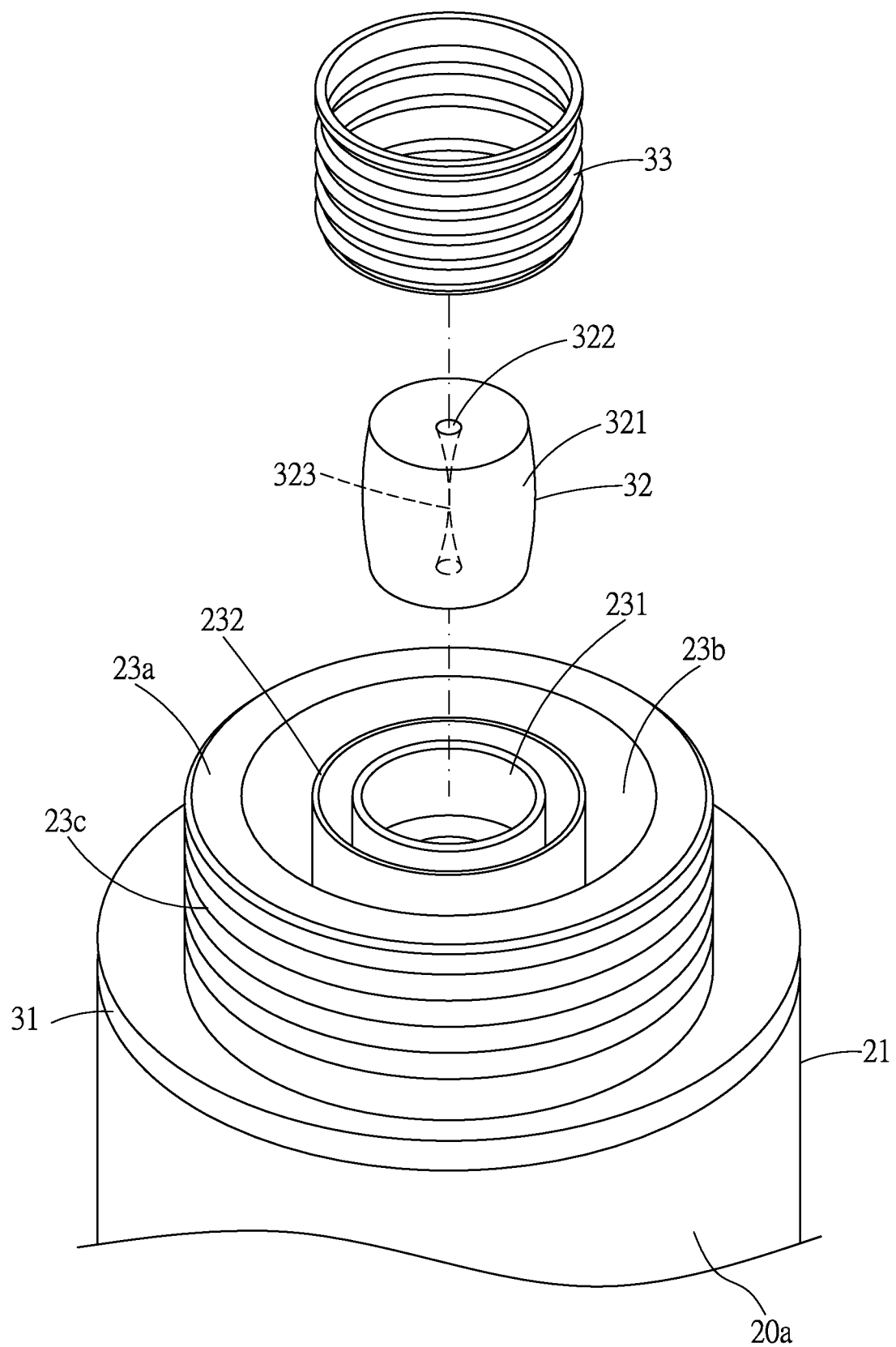
FIG. 2 is a partial enlarged perspective view of the continuable power module of the first embodiment of the disclosure.
Figure 4:
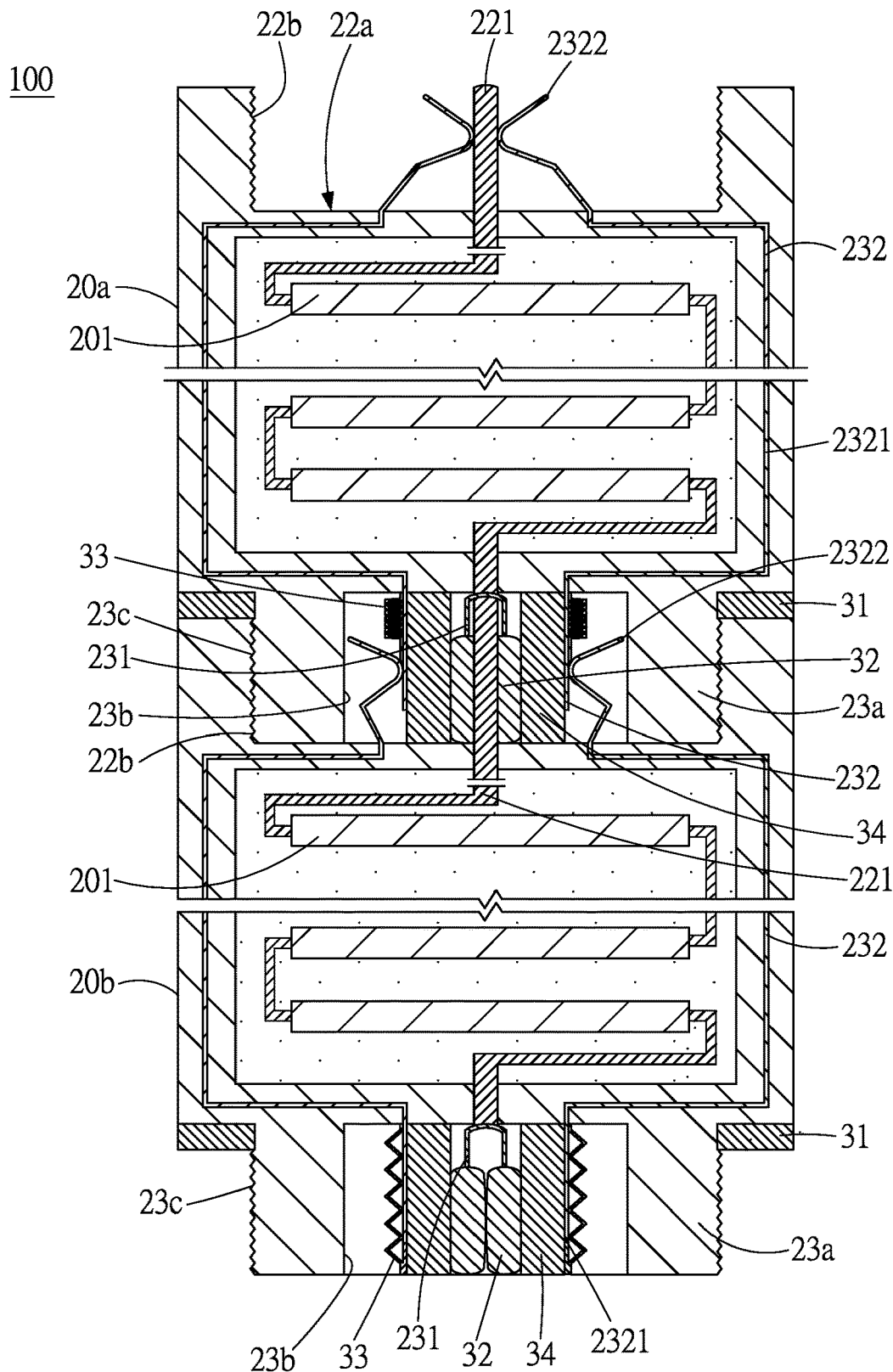
FIG. 4 is an operating schematic view of the continuable power module of the first embodiment of the disclosure.

Please refer to FIG. 1, FIG. 2 and FIG. 4, in which the battery 20 includes a main body 21, a first electrode terminal 221 (i.e., a first terminal member), a second electrode terminal 231 (i.e., a second terminal member), and a conducting terminal 232. In this embodiment, the main body 21 is approximately formed as a round cylinder, but embodiments of the disclosure are not limited thereto; the structure of the main body 21 can also be a cuboid, a triangular cylinder and so forth for correspondingly receiving in the battery receiving groove. That is, the outer diameter of the battery 20 is approximately equal to the inner diameter of the battery receiving groove. Additionally, although the heights of the batteries 20 shown in the features are the same, but embodiments of the disclosure are not limited thereto; that is, the heights of the batteries 20 can be different for correspondingly receiving the battery cores 201 with different voltages, or can be the same for receiving the battery cores 201 with different voltages. Here, the battery core 201 can be the battery core of a dry cell, an alkaline cell or a lithium cell, but embodiments of the disclosure are not limited thereto; for instance, the battery core 201 can also be the battery core of a rechargeable cell. Here, the number of the battery cores 201 is not limited in the main body 21 of each battery 20. Additionally, in some embodiments, the battery core 201 is connected electrically to the aforementioned terminals via conducting wires or circuit boards with the aiding of welding, packaging and connecting means so forth, instead of directly connected electrically to the aforementioned terminals.

The main body 21 has a connecting end 22 (i.e., a male terminal body) and a continuing end 23 (i.e., a female terminal body) respectively defined at two ends thereof. The first electrode terminal 221 is disposed at the connecting end 22, and the second electrode terminal 231 is disposed at the continuing end 23. The structure of the second electrode terminal 231 matches with the structure of the first electrode terminal 221, such that the first electrode terminal 221 of the battery 20b is connected electrically to the second electrode terminal 231 of the battery 20a. The first electrode terminal 221 and the second electrode terminal 231 are respectively connected electrically to the battery core 201; that is, one end of the first electrode terminal 221 of the battery 20b which is exposed out of the main body 21 can be connected to one end of the second electrode terminal 231 of the battery 20a which is exposed out of the main body 21, while the other end of the first electrode terminal 221 of the battery 20b and the other end of the second electrode terminal 231 of the battery 20a are respectively connected to the corresponding battery cores 201 of the battery 20a and the battery 20b. Here, the first electrode terminal 221 can be the positive terminal, and the second electrode terminal 231 can be the negative terminal, but embodiments of the disclosure are not limited thereto; that is, the electric potential of the first electrode terminal 221 is different from that of the second electrode terminal 231. As shown in FIG. 4, the first electrode terminal 221 is connected electrically to the positive terminal of the battery core 201, and the second electrode terminal 231 is connected to the negative terminal of the battery core 201. For convenience, hereinafter, the first electrode terminal 221 is defined as the positive terminal and the second electrode terminal 231 is defined as the negative terminal.

The conducting terminal 232 includes a secured end 2321 (i.e., a secured terminal member) and a free end 2322 (i.e., a free terminal member); namely, two ends of the conducting terminal 232 are respectively the secured end 2321 and the free end 2322. The secured end 2321 is disposed at the continuing end 23, while the free end 2322 is detachably connected to the first electrode terminal 221. For each battery 20a, 20b, the conducting terminal 232 is connected electrically to the first electrode terminal 221 via the free end 2322, such that the continuing end 23 of one battery 20a is connected to the connecting end 22 of another battery 20b to form a series connection for increasing the outputted voltage. In this embodiment, the first electrode terminal 221, the second electrode terminal 231, and the conducting terminal 232 are secured in the main body 21 via plastic injection molding techniques; that is, when the aforementioned terminals are manufactured and the corresponding relationships therebetween are built, the main body 21 of the battery 20 can be produced by plastic injection molding with the aforementioned terminals being embedded in the main body 21; but embodiments of the disclosure are not limited thereto, those who are skilled in the art might apply other techniques to dispose the aforementioned terminal in the main body 21. Additionally, being embedded in the main body 21, the aforementioned terminals can also be disposed in the space defined in the main body 21, as shown in FIG. 3D.

Figure 3A:
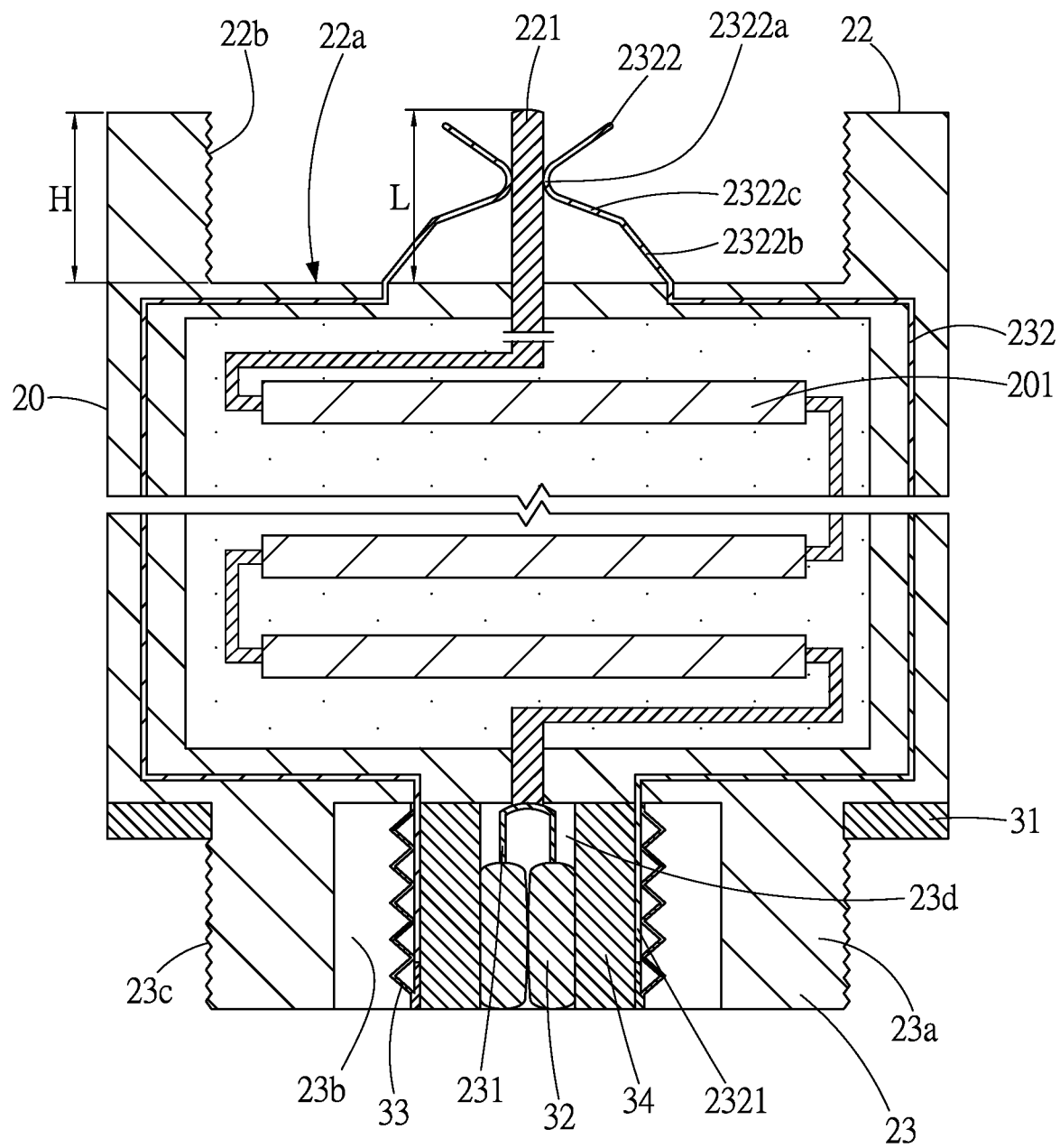
FIG. 3A is a partial cross-sectional view (1) of the continuable power module of the first embodiment of the disclosure.

Please refer to FIG. 3A, in which in one implementation aspect, the connecting end 22 includes a positioning portion 22a, and a positioning structure 22b. The positioning portion 22a is recessed at a center of the connecting end 22 for receiving the first electrode terminal 221 and the free end 2322 of the conducting terminal 232, while the positioning structure 22b is annularly disposed at an inner wall of the positioning portion 22a. Here, the positioning structure 22b is an internal threading structure, but embodiments of the disclosure are not limited thereto; in some cases, the positioning structure 22b can be an engaging groove or structures similar thereto. As shown in FIG. 3A, in one embodiment, an exposed length L of the first electrode terminal 221 is approximately equal to the height H of the wall surface of the continuing end 22 having the positioning structure 22b (i.e., the height of the male terminal body).

The continuing end 23 includes a limiting portion 23a, a void 23b, and a limiting structure 23c. The continuing end 23 further includes an extension portion 34' and a tunnel 23d. The extension portion 34' is protruding from a middle portion of the continuing end 23, and the tunnel 23d is recessed from a middle portion of the extension portion 34' for receiving the second electrode terminal 231 and the secured end 2321. The limiting portion 23a is protruded from a center of the continuing end 23, and the structure thereof is matched with the structure of the positioning portion 22a of the connecting end 22. The void 23b is located at a center of the limiting portion 23a for receiving the second electrode terminal 231 and the secured end 2321 of the conducting terminal 232. That is, the void 23b is for receiving the extension portion 34' along with the second electrode terminal 231 and the secured end 2321. Hence, a surrounding groove (i.e., an outer portion of the void 23b) is formed between an inner wall of the limiting portion 23a and an outer wall of the extension portion 34'. The limiting structure 23c is annularly disposed at an outer wall of the limiting portion 23a for correspondingly matching with the positioning structure 22b of the connecting end 22. Here, the limiting structure 23c is an external threading structure so as to threading with the positioning structure 22b, but embodiments of the disclosure are not limited thereto; in some cases, the limiting structure 23c can be an engaging block or other structures so as to be detachably connected to the positioning structure 22b. As shown in FIG. 3A to FIG. 3D, in one embodiment, an end portion of the extension portion 34' is substantially flushed with an end portion of the secured end 2321 (i.e., the secured terminal member), the second electrode terminal 231 (i.e., the second terminal member) is separated from the secured end 2321 by the extension portion 34', an end portion of the second electrode terminal 231 is not flushed with the end portion of the extension portion 34', the second electrode terminal 231 is enclosed by the extension portion 34', and one end of the tunnel 23d is closed. As shown in FIG. 3C, in one embodiment, one end of the void 23b is closed.

Via the matching between the positioning portion 22a and the limiting portion 23a and the matching between the positioning structure 22b and the limiting structure 23c, the continuing end 23 of the battery 20a is connected and fastened with the connecting end 22 of the battery 20b, and the free end 2322 is received in the surrounding groove.

Figure 3B:
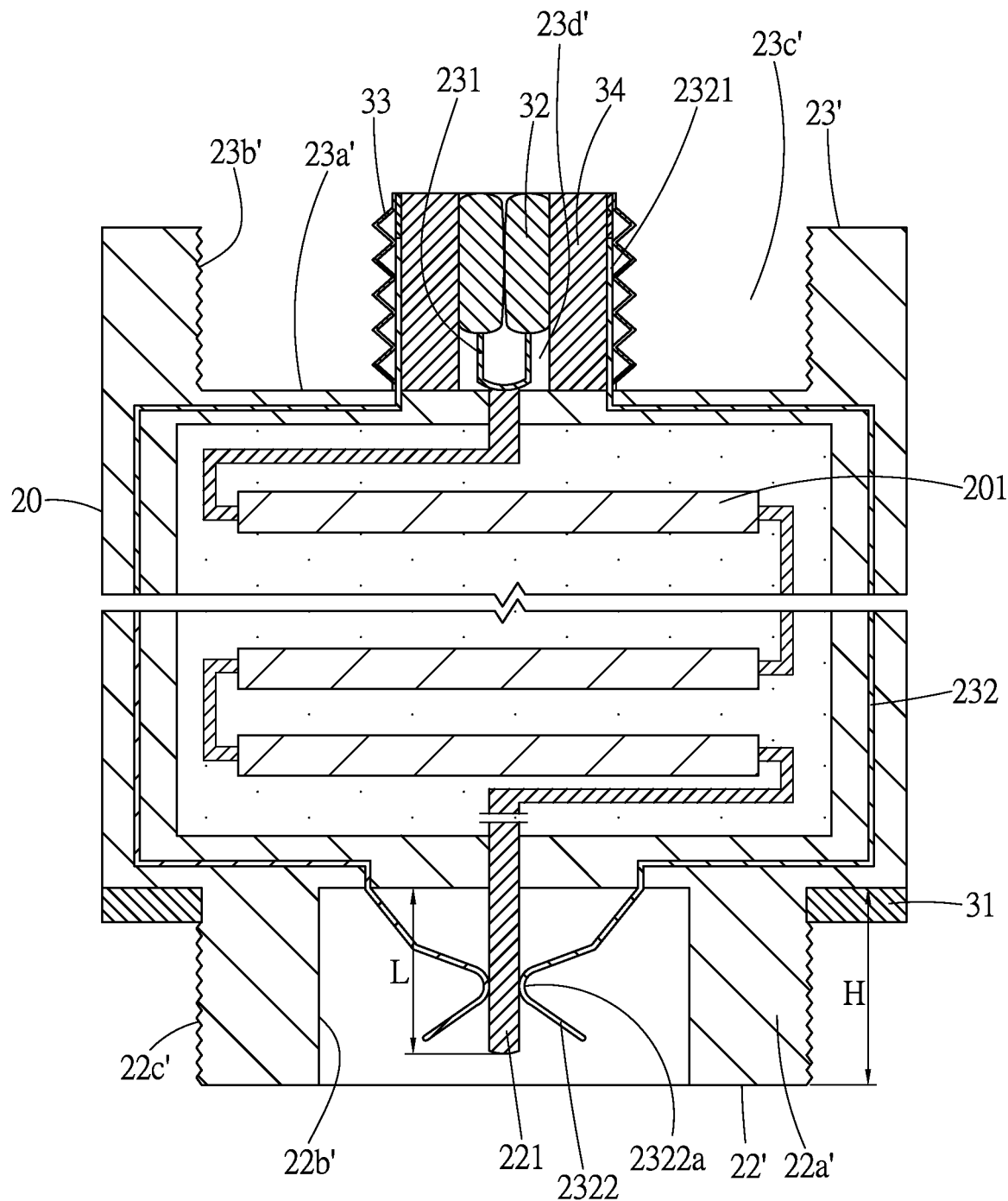
FIG. 3B is a partial cross-sectional view (2) of the continuable power module of the first embodiment of the disclosure.
Figure 3C:
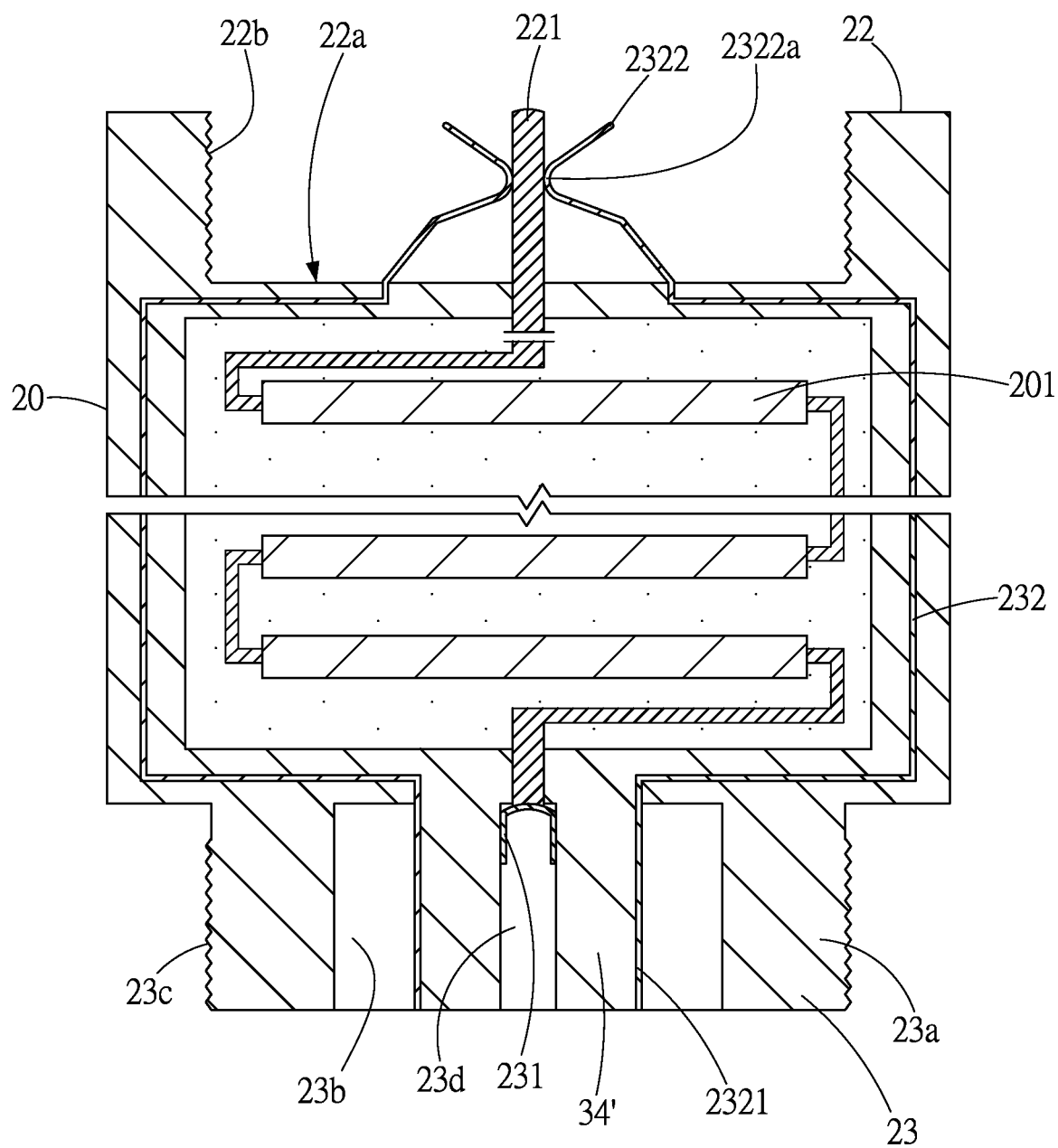
FIG. 3C is a partial cross-sectional view (3) of the continuable power module of the first embodiment of the disclosure.
Figure 3D:
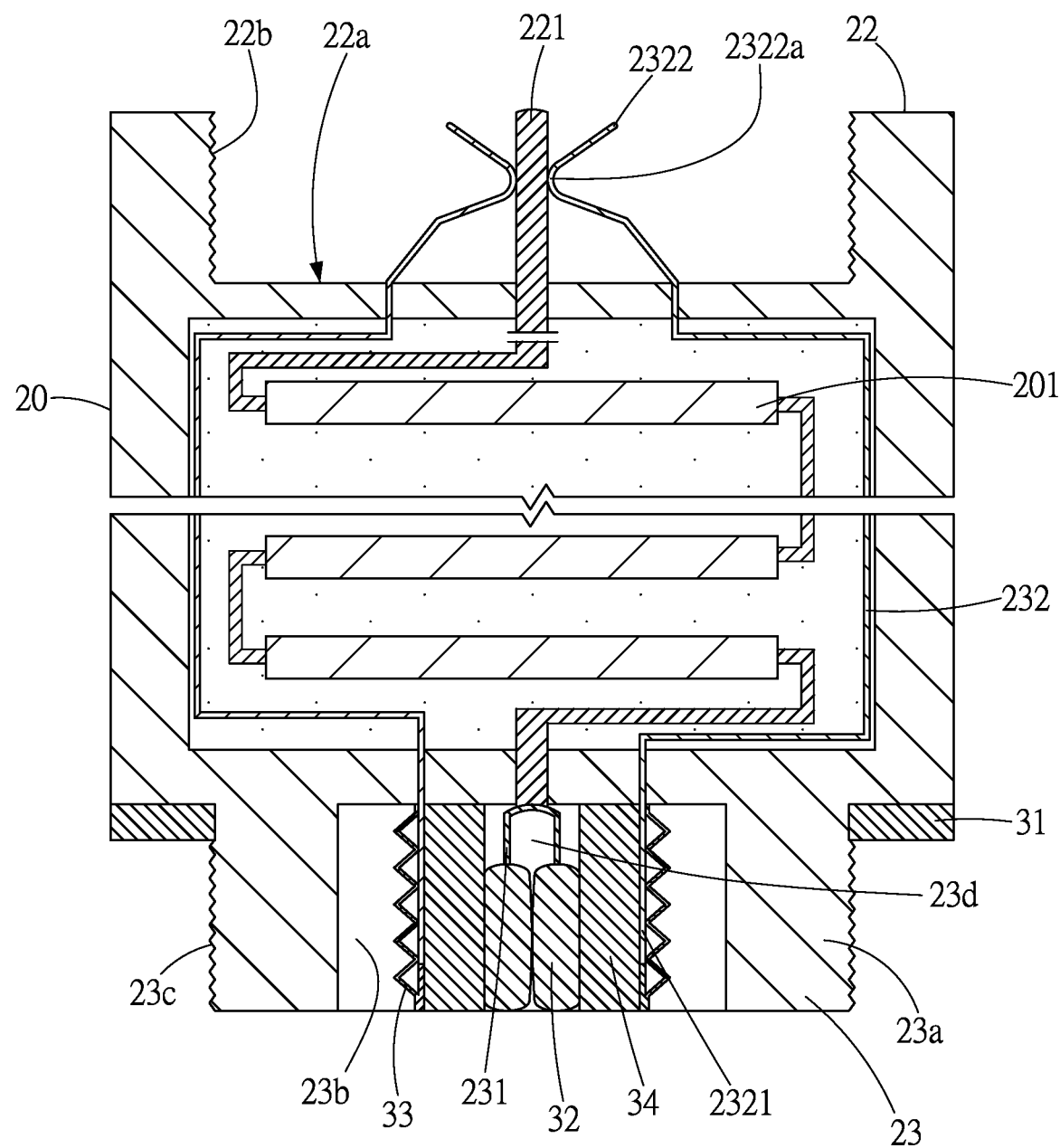
FIG. 3D is a partial cross-sectional view (4) of the continuable power module of the first embodiment of the disclosure.

Please refer to FIG. 3B, in which in one implementation aspect, the connecting end 22 includes a limiting portion 22a', a void 22b', and a limiting structure 22c'. The limiting portion 22a' is protruded from a center of the connecting end 22. The void 22b' is located at a center of the limiting portion 22a' for receiving the first electrode terminal 221 and the free end 2322 of the conducting terminal 232. The limiting structure 22c' is annularly disposed at an outer wall of the limiting portion 22a'. Here, the limiting structure 22c' is an external threading structure, but embodiments of the disclosure are not limited thereto; the limiting structure 22c' can also be an engaging block. The continuing end 23 includes a positioning portion 23a' and a positioning structure 23b'.

The continuing end 23 further includes an extension portion 34' and a tunnel 23d'. The extension portion 34' is protruding from a middle portion of the continuing end 23, and the tunnel 23d' is recessed from a middle portion of the extension portion 34' for receiving the second electrode terminal 231 and the secured end 2321. The positioning portion 23a' is recessed at a center of the continuing end 23 for receiving the second electrode terminal 231 and the secured end 2321 of the conducting terminal 232 and correspondingly matches with the limiting portion 22a' of the connecting end 22. That is, the positioning portion 23a' is for receiving the extension portion 34' along with the second electrode terminal 231 and the secured end 2321. Hence, a peripheral groove 23c' is formed between an inner wall of the positioning portion 23b' and an outer wall of the extension portion 34'. The positioning structure 23b' is annularly disposed at an inner wall of the positioning portion 23a' so as to correspondingly match with the limiting structure 22b' of the connecting end 22. Here, the positioning structure 23b' is an internal threading structure, but embodiments of the disclosure are not limited thereto; the positioning structure 23b' can also be an engaging groove so as to correspondingly match with the engaging block. Similarly, via the matching between the positioning portion 23a' and the limiting portion 22a' and the matching between the positioning structure 23b' and the limiting structure 22c', the continuing end 23 of the battery 20a is connected and fastened with the connecting end 22 of the battery 20b, and the free end 2322 is received in the peripheral groove 23c' (not shown). As shown in FIG. 3B, in one embodiment, an exposed length L of the first electrode terminal 221 is less than the height H of the wall surface of the continuing end 22 having the limiting structure 22c' (i.e., the height of the male terminal body).

Please refer to FIG. 4 again, in which in this embodiment, the first electrode terminal 221 is a thin rod-like structure, and the second electrode terminal 231 is a circular groove structure which has a receiving space (that is the space defined in the second electrode terminal 231) for correspondingly receiving the first electrode terminal 221. The secured end 2321 of the conducting terminal 232 is a ring structure disposed around the outer periphery of the second electrode terminal 231. In other words, the second electrode terminal 231 and the secured end 2321 of the conducting terminal 232 are disposed concentrically. The conducting terminal 232 is made of conductive material, such as metal, conductive rubber, conductive polymer, etc. The free end 2322 of the conducting terminal 232 is a flexible stripe structure, so that the free end 2322 of the conducting terminal 232 is movably leant against the first electrode terminal 221. As shown in FIG. 3A, the free end 2322 is detachably in contact with a middle portion of the first electrode terminal 221. As shown in FIG. 3A, the free end 2322 has an inclined portion 2322b and a bent portion 2322a connected to the inclined portion 2322b, the bent portion 2322a is detachably in contact with an outer wall of the first electrode terminal 221 in a point-contact manner. As shown in FIG. 3A, the bent portion 2322a is a V-shaped structure, and a bottom portion of the V-shaped structure is detachably in contact with the outer wall of the first electrode terminal 221 in the point-contact manner. As shown in FIG. 3A, in one embodiment, the bottom portion of the V-shaped structure has a curved surface. As shown in FIG. 3A, in one embodiment, the inclined portion 2322b is connected to a tail portion 2322c of the bent portion 2322a, and an obtuse angle is between the tail portion 2322c and the inclined portion 2322b. Here, the number of the conducting terminal 232 is two, and the two free ends 2322 of the two conducting terminals 232 are respectively leant against the two sides of the first electrode terminal 221; but, it is understood that the number of the conducting terminal 232 is not limited thereto.

Please refer to FIG. 3A, in which when the battery 20a is not connected to another battery 20b, the free end 2322 of the conducting terminal 232 is leant against the first electrode terminal 221, such that the conducting terminal 232 is connected electrically to the first electrode terminal 221 via the free end 2322. Therefore, the positive terminal and the negative terminal of the battery 20a are respectively defined at the secured end 2321 of the conducting terminal 232 and the second electrode terminal 231. Please refer to FIG. 4, in which when the continuing end 23 of the battery 20a is connected to the connecting end 22 of the battery 20b, the free end 2322 of the conducting terminal 232 of the battery 20b is detached from the first electrode terminal 221 and leant against an outer periphery of the secured end 2321 of the conducting terminal 232 of the battery 20a, such that the second electrode terminal 231 of the battery 20a is connected electrically to the first electrode terminal 221 of the battery 20b. Under this arrangement, the positive terminal and the negative terminal are respectively at the secured end 2321 of the conducting terminal 232 and the second electrode terminal 231 of the battery 20b. Similarly, when the battery 20a is detached from the battery 20b, the free end 2322 of the conducting terminal 232 of the battery 20b is again leant against the first electrode terminal 231 thereof, such that the conducting terminal 232 thereof is connected electrically to the first electrode terminal 231 via the free end 2322.

Based on the above, when the batteries 20a is connected to the battery 20b via a series connection, the continuing end 23 of the battery 20a is connected to the connecting end 22 of the battery 20b; meanwhile, the second electrode terminal 231 of the battery 20a is correspondingly connected to the first electrode terminal 221 of the battery 20b. Under this arrangement, a number of batteries 20 are connected electrically to each other via a series connection, so that the voltages of the continuable power module 100 are increased.

Figure 5A:
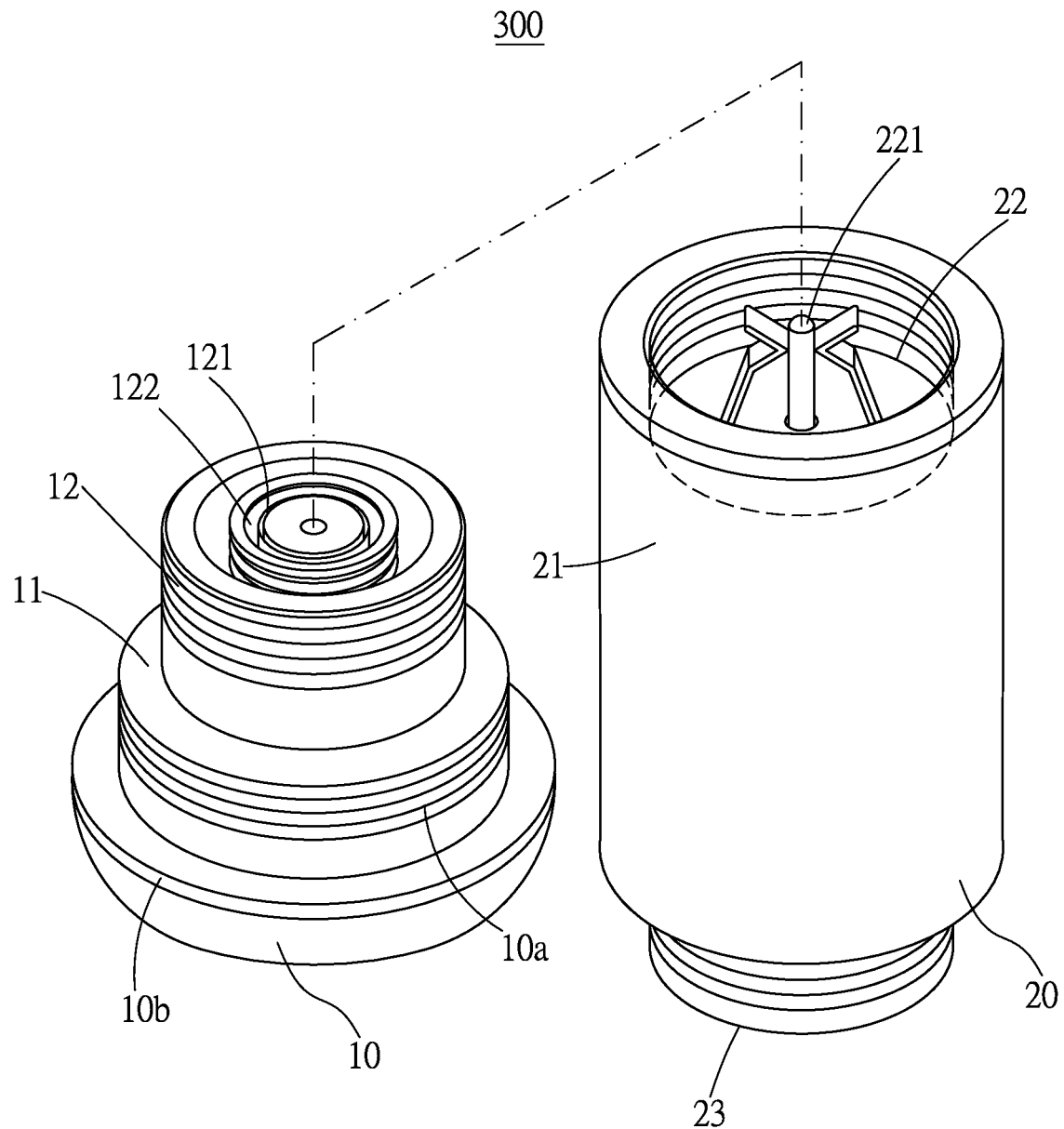
FIG. 5A is a perspective view (1) of a continuable power module of a second embodiment of the disclosure.
Figure 5B:
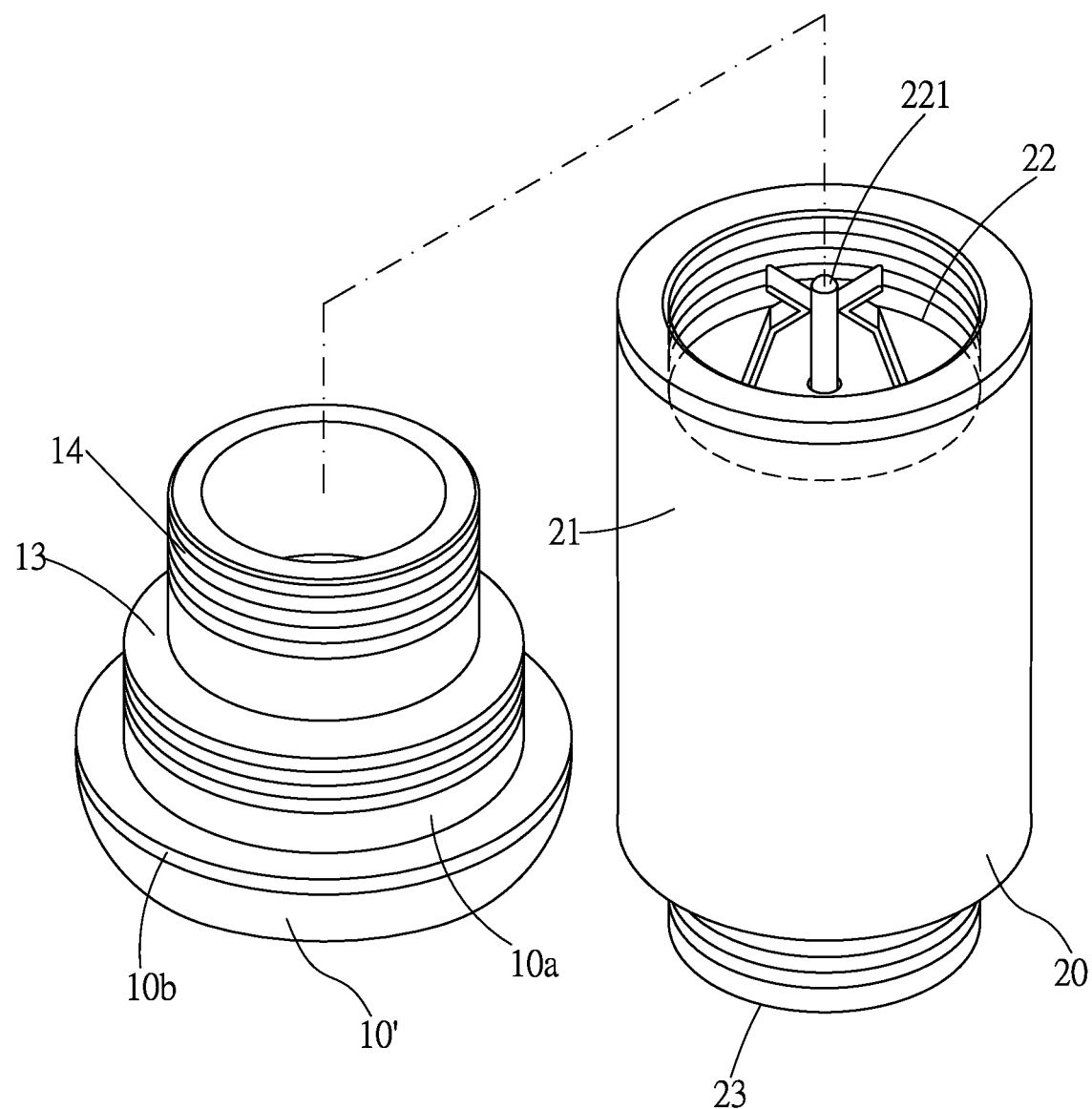
FIG. 5B is a perspective view (2) of the continuable power module of the second embodiment of the disclosure.
Figure 6:
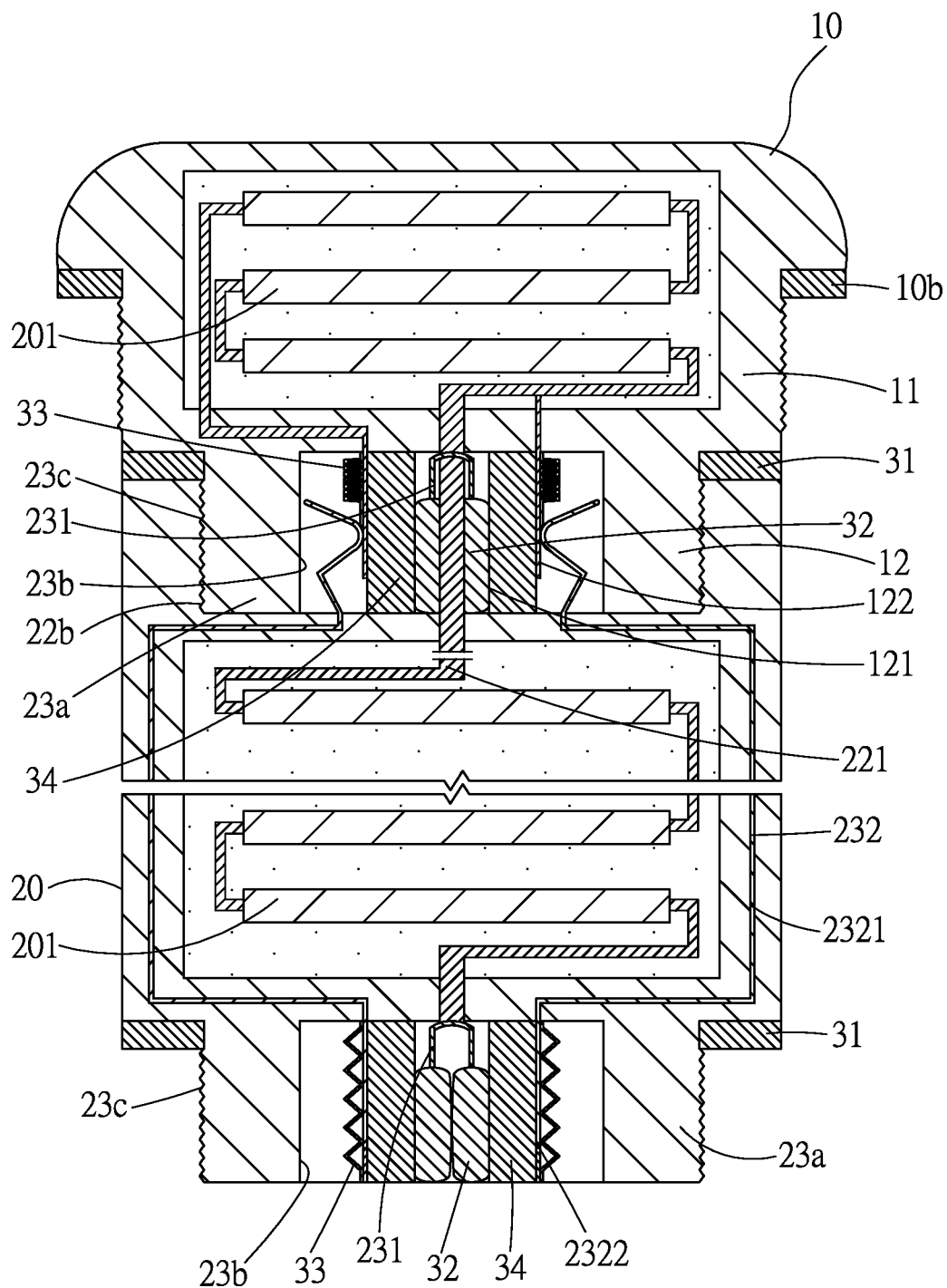
FIG. 6 is a cross-sectional view of the continuable power module of the second embodiment of the disclosure.

Please refer to FIG. 5A, FIG. 5B and FIG. 6, which are perspective views and a cross-sectional view of a continuable power module 300 of the second embodiment of the disclosure. The second embodiment is generally similar to the first embodiment, except that the continuable power module 300 of the second embodiment further has a base member 10 connectable with the battery 20. In this embodiment, the structure of the base member 10 matches with the structure of the battery 20 so as to be round cylindered, but embodiments of the disclosure are not limited thereto; the structure of the base member 10 can also be a cuboid, a triangular cylinder and so forth for correspondingly receiving in the battery receiving groove; that is, the outer diameter of the base member 10 is approximately equal to the inner diameter of the battery receiving groove.

In one implementation aspect, the base member 10 includes a base body 11, a linking end 12, a first contacting terminal 121, and a second contacting terminal 122. The linking end 12 is disposed at one side of the base body 11. The first contacting terminal 121 is disposed at the linking end 12, and the structure of the first contacting terminal 121 is substantially the same as that of the second electrode terminal 231 and matches with the structure of the first electrode terminal 221 of the battery 20, such that the first contacting terminal 121 of the base member 10 is connected electrically to the first electrode terminal 221 of the battery 20. The second contacting terminal 122 is disposed at the linking end 12 of the base body 10 and connected electrically to the first contacting terminal 121. Here, the structure of the linking end 12 is substantially the same as the structure of the continuing end 23 of the battery 20; in other words, the structure of the linking end 12 of the base member 10 is corresponding to the structure of the connecting end 22 of the battery 20. Similarly, the structures of the first contacting terminal 121 and the second contacting terminal 122 are generally similar to the structures of the second electrode terminal 231 and the secured end 2321 of the conducting terminal 232 respectively; certainly, when the linking end 12 of the base member 10 is connected electrically to the connecting end 22 of the battery 20, the first contacting terminal 121 and the second contacting terminal 122 of the linking end 12 are respectively matched with the first electrode terminal 221 and the free end 2322 of the conducting terminal 232 of the battery 20, the detail connection mechanism between the battery 20 and the base member 10 is substantially similar to that between a number of batteries 20 so as to be omitted here.

Please refer to FIG. 5B, in which in one implementation aspect, the base member 10' includes a base body 13 and a receiving end 14. The receiving end 14 is disposed at one side of the base body 13, and the structure thereof matches with the connecting end 22 of the battery 20 so as to receive the first electrode terminal 221 and the free end 2322 of the conducting terminal 232 of the battery 20. Here, the receiving end 14 has a containing groove (that is, the space defined inside the receiving end 14), to receive the first electrode terminal 221 and the free end 2322 of the conducting terminal 232. Under this arrangement, when the battery 20 is connected to the base member 10, the positioning portion 22a of the battery 20 is enclosed by the base member 10, such that the free end 2322 of the conducting terminal 232 received in the positioning portion 22a is not detached from the first electrode terminal 221 via the outside affections, the electrical connection between the first electrode terminal 221 and the free end 2322 of the conducting terminal 232 being maintained within the receiving end 14.

Please refer to FIG. 5A again, in which in one implementation aspect, the base member 10 has a fixing portion 10a disposed at a periphery of the base body 11, so that the base member 10 can be fastened with the battery receiving groove of the electric appliance. In this embodiment, the fixing portion 10a is a locking-connecting structure which has threaded patterns so as to be fastened with the battery receiving groove, but embodiments of the disclosure are not limited thereto. In one embodiment, the base member 10 is formed as a cone structure, and the diameter is gradually decreased from the bottom thereof toward the linking end thereof with an elastic rubber ring fitted thereover (not shown), so that the base member 10 is capable of closely attaching with the battery receiving groove via the elasticity of the elastic rubber ring; additionally, the elastic rubber ring also provides a function of waterproofing which avoids liquids or dusts from entering into the battery receiving groove and influencing the operation of the electric appliance.

In one implementation aspect, a first waterproof member 10b made of elastic material is adjacently disposed to the fixing portion 10a of the base member 10 and around the periphery of the base member 10 so as to be capable of proving a function of waterproofing; for example, the first waterproof member 10b can be a rubber washer, but embodiments of the disclosure are not limited thereto.

Please refer to FIG. 5A again, in which commonly, the diameter (the cross-sectional area), of one end of the base body 11 which is opposite to the linking end 12 thereof is larger than that of the linking end 12, such that when the fixing portion 10a has correspondingly been fastened with the battery receiving groove of the electric appliance, parts of the base member 10 are still exposed out of the battery receiving groove and the battery 20 can be exchanged conveniently. In this embodiment, the base member 10 is an adapting member and does not have the function of providing electricity (namely, the base member 10 does not have the battery core 201), but embodiments of the disclosure are not limited thereto; in some embodiments, the base member 10 has the battery core 201 disposed therein (as shown in FIG. 6), and the battery core 201 is connected electrically to the first contacting terminal 121 and the second contacting terminal 122 and capable of providing electricity as the battery 20 does.

Furthermore, please refer to FIG. 2, FIG. 3A, FIG. 4 and FIG. 6, in which in order to be capable of waterproofing, following features are introduced into the disclosure.

Please refer to FIG. 4 and FIG. 6, in which a second waterproof member 31 is disposed between the battery 20 and the base member 10 and between the battery 20a and the battery 20b. In one implementation aspect, the second waterproof member 31 is fitted over and fastened on the linking end 12 of the base member 10 and the continuing end 23 of the battery 20a; while in another implementation aspect, the second waterproof member 31 is disposed at the connecting end 22 of the battery 20b (not shown). Based on this, when the battery 20a is connected to the battery 20b or the base member 10, moist will not enter into the spaces between the batteries 20a, 20b or between the battery 20a and the base member 10 from the gaps therebetween, such that the leak of electricity is prevented. Here, the second waterproof member 31 is a waterproof washer, and preferably made of rubber, but embodiments of the disclosure are not limited thereto.

Figure 3E:
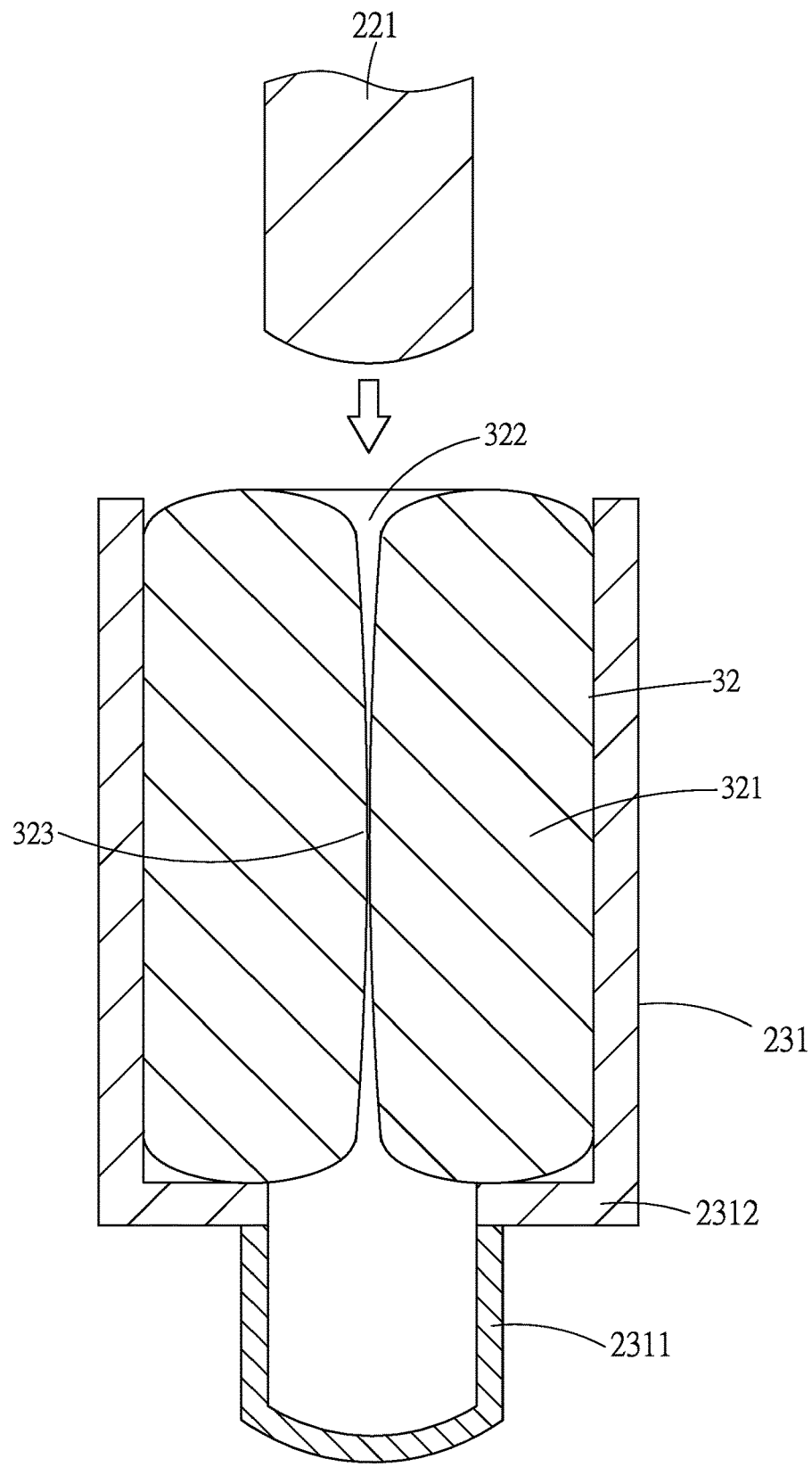
FIG. 3E is an operating schematic view (1) of a waterproof elastomer of the continuable power module of the first embodiment of the disclosure.
Figure 3F:
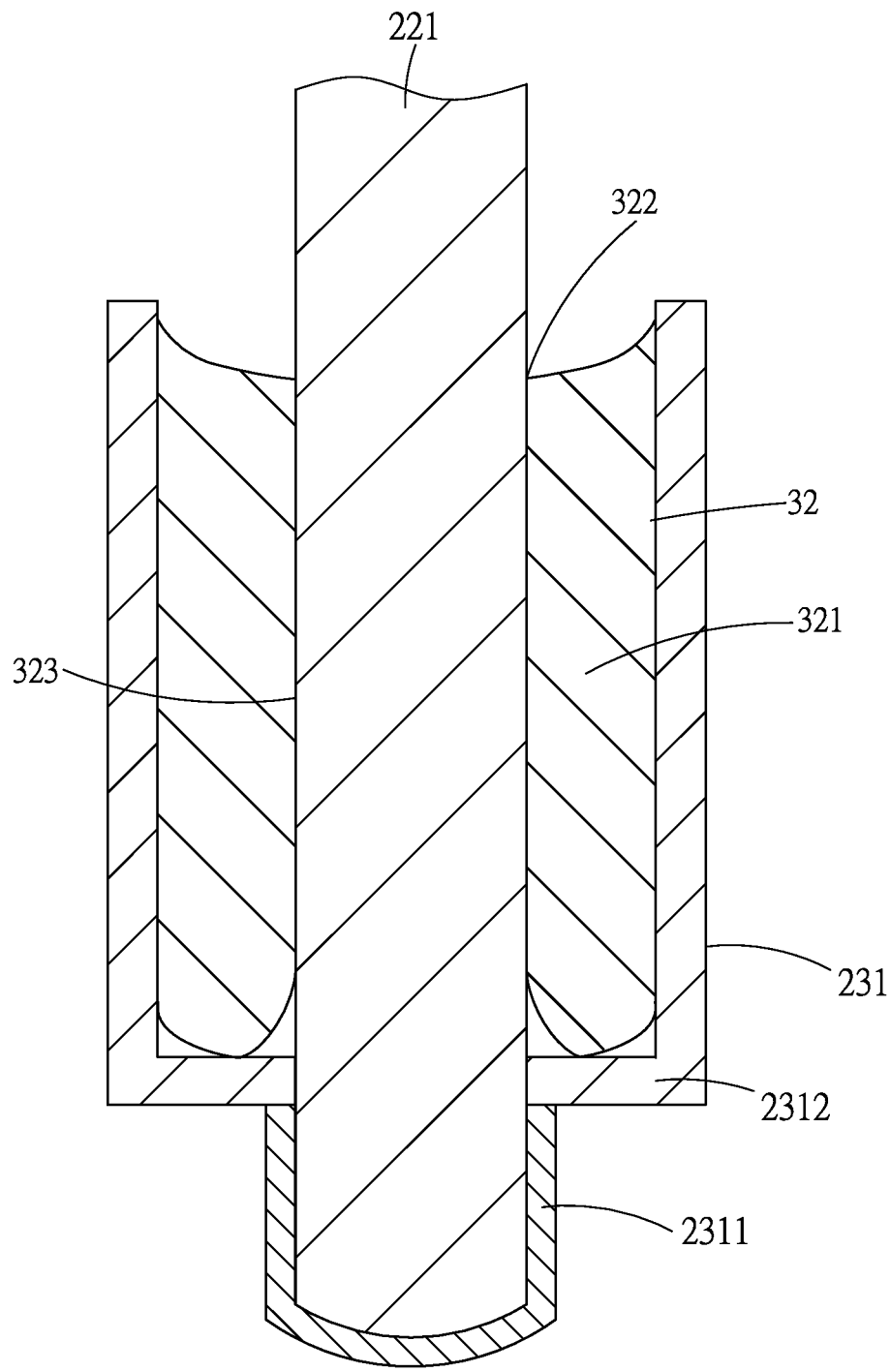
FIG. 3F is an operating schematic view (2) of the waterproof elastomer of the continuable power module of the first embodiment of the disclosure.

Please refer to FIG. 2, FIG. 3A and FIG. 4, in which the second electrode terminal 231 further has at least one waterproof elastomer 32 assembled in the receiving space thereof. In detail, the waterproof elastomer 32 is fastened in the receiving space of the second electrode terminal 231 and is made of soft material with flexible character, such as foam, silica gel or latex, but embodiments of the disclosure are not limited thereto. Please refer to FIG. 3E and FIG. 3F, in which the waterproof elastomer 32 is substantially a hollow cylinder structure made of elastic materials with fluids (liquids or gases), being filled therein. The waterproof elastomer 32 includes an elastomer body 321, and a channel 322 is opened at a center thereof. The channel 322 has a plurality of protruding portions 323 defined annularly around an inner wall thereof and radially protruded inward along the cross-sectional plane of the middle segment of the waterproof elastomer 32 to block moist from moving from one end of the channel 322 toward the other end of the channel 322, such that the waterproof elastomer 32 is watertight. Please refer to FIG. 3F again, in which when the first electrode terminal 221 of the battery 20a is connected electrically to the second electrode terminal 231 of the battery 20b, the first electrode terminal 221 is passing through the elastomer body 32 via the channel 322 and connected electrically to the second electrode terminal 231; at the same time, the protruding portions 323 of the elastomer body 321 is pressed outwardly toward a direction perpendicular to the inserting direction of the first electrode terminal 221 by the first electrode terminal 221, so that the elastomer body 321 is closely attached with the receiving space of the second electrode terminal 231 and the moist cannot enter into the receiving space from the gap between the elastomer body 321 and the receiving space. Additionally, as shown in FIG. 3F, due to the pressure caused by the first electrode terminal 221 and the circumstances, the middle part of one end of the elastomer body 321 which is exposed outside (that is, one end far from the battery core 201), is recessed inward, and the outer periphery thereof is not compressed because of the increasing of the pressure inside the elastomer body 321. Furthermore, as shown in FIG. 3E and FIG. 3F, the second electrode terminal 231 has a terminal inserting portion 2311 and an abutting wall 2312. The terminal inserting portion 2311 is recessed at the center part of the receiving space of the second electrode terminal 231 and provided for electrically connecting with the first electrode terminal 221; while the abutting wall 2312 is substantially the bottom of the receiving space which is capable of blocking and abutting the elastomer body 321 from pressing the terminal inserting portion 2311. That is, in FIG. 3E and FIG. 3F, the terminal inserting portion 2311 is recessed at the center part of the receiving space of the second electrode terminal 231, but embodiments of the disclosure are not limited thereto, the terminal inserting portion 2311 can be disposed at the bottom of the receiving space or closely attaching with the inner wall of the receiving space. It is understood that, as shown in FIG. 3E and FIG. 3F, when the first electrode terminal 221 is connected electrically to the second electrode terminal 231, the first electrode terminal 221 is attached with the bottom and the inner wall of the terminal inserting portion 2311 of the second electrode terminal 231, but embodiments of the disclosure are not limited thereto, the first electrode terminal 221 also can be only attached with the bottom or the inner wall of the terminal inserting portion 2311. As shown in FIGS. 3E and 3F, in one embodiment, a bottom surface of the terminal insertion portion 2311 is a curved surface. Moreover, a space within the receiving space of the abutting portion 2312 is greater than a space within the terminal inserting portion 2311.

As shown in FIG. 3A, when the battery 20a is not connected to the battery 20b, the second electrode terminal 231 of the battery 20a is substantially protected by the waterproof elastomer 32 so that moist cannot enter into the receiving space of the second electrode terminal 231. As shown in FIG. 4, when the first electrode terminal 221 of the battery 20b is connected to the second electrode terminal 231 of the battery 20a, the waterproof elastomer 32 is extruded and the channel 322 thereof is opened by the first electrode terminal 221, such that the first electrode terminal 221 is smoothly inserted into the bottom of the receiving space of the second electrode terminal 231 (that is, the first electrode terminal 221 is attached with the terminal inserting portion 2311 of the second electrode terminal 231), and the electrical connection between the battery 20a and the battery 20b is achieved. Similarly, when the first electrode terminal 221 is pulled out from the second electrode terminal 231, the waterproof elastomer 32 in the receiving space of the second electrode terminal 231 is resiliently moved back to an original position thereof due to the elasticity.

Please refer to FIG. 2, FIG. 3A and FIG. 4, in which the secured end 2321 of the conducting terminal 232 of the continuing end 23 has a flexible folding member 33 fitted thereover in which the structure thereof is substantially similar to a blast pipe or a shock absorber and capable of being folded and telescoped. As shown in FIG. 3A, when the battery 20a is not connected to the battery 20b, the secured end 2321 of the conducting terminal 232 is enclosed by the flexible folding member 33, thereby preventing the moist from contacting the secured end 2321 of the conducting terminal 232. Additionally, as shown in FIG. 4, when the continuing end 23 of the battery 20a is connected to the connecting end 22 of the battery 20b, the flexible folding member 33 of the battery 20a is compressed inward along the length direction of the secured end 2321 of the conducting terminal 232 of the battery 20a along with the pushing of the free end 2322 of the conducting terminal 232 of the battery 20b and the secured end 2321 of the conducting terminal 232 of the battery 20a is exposed out from the flexible folding member 33, so that the free end 2322 of the conducting terminal 232 of the battery 20b is leant against and connected electrically to the secured end 2321 of the conducting terminal 232 of the battery 20a. Similarly, when the continuing end 23 of the battery 20a is detached from the connecting end 22 of the battery 20b, the flexible folding member 33 of the battery 20a is moved resiliently to the original position thereof, due to the elasticity.

Briefly, when the battery 20a is not connected to the battery 20b, the waterproof elastomer 32 blocks the moist from entering into the second electrode terminal 231 and prevents from events of leaking electricity; while the flexible folding member 33 has the function of separating the secured end 2321 of the conducting terminal 232 from the circumstance, such that the moist cannot contact the secured end 2321 of the conducting terminal 232, thereby event of leaking electricity being prevented. When the battery 20a is connected to the battery 20b, the waterproof elastomer 32 of the battery 20a is extruded and the channel 322 thereof is opened by the first electrode terminal 221 of the battery 20b, such that the first electrode terminal 221 of the battery 20b is inserted into the second electrode terminal 231 of the battery 20a to achieve the electrical connection therebetween; simultaneously, the flexible folding member 33 of the battery 20a is compressed inward along the length direction of the secured end 2321 of the conducting terminal 232 of the battery 20a along with the pushing of the free end 2322 of the conducting terminal 232 of the battery 20b and the secured end 2321 of the conducting terminal 232 of the battery 20a is exposed out from the flexible folding member 33, so that the free end 2322 of the conducting terminal 232 of the battery 20b is connected electrically to the secured end 2321 of the conducting terminal 232 of the battery 20a. Under this arrangement, the battery 20a and the battery 20b are connected electrically to each other. Conversely, when the battery 20a is detached from the battery 20b, the waterproof elastomer 32 of the battery 20a is resiliently moved back to an original position thereof along with the departing of the first electrode terminal 221 of the battery 20b due to the elasticity; meanwhile, the flexible folding member 33 of the battery 20a is also resiliently moved back to the original position thereof along with the departing of the free end 2322 of the conducting terminal 232 of the battery 20b.

It is understood that the disclosure is not limited with the embodiments having the second waterproof member 31, the waterproof elastomer 32 and/or the flexible folding member 33; in some embodiments, the disclosure does not have the aforementioned waterproof members, as shown in FIG. 3C.

It is also understood that in order to prevent the second electrode terminal 231 from contacting the secured end 2321 of the conducting terminal 232 (in the case of the base member 10 capable of providing electricity, to prevent the first contacting terminal 121 from contacting the second contacting terminal 122), which would lead the short circuit, the extension portion 34' is disposed between the second electrode terminal 231 and the secured end 2321 of the conducting terminal 232 (or between the first contacting terminal 121 and the second contacting terminal 122), for separation (in this embodiment, the extension portion 34' may be insulated and called an insulating member 34). The insulating member 34 is made of rubber, but embodiments of the disclosure are not limited thereto; the insulating member 34 can also be made of hard plastic material which is disposed between the second electrode terminal 231 and the secured end 2321 of the conducting terminal 232 (or between the first contacting terminal 121 and the second contacting terminal 122). It is understood that, the insulating member 34 and the main body 21 also can be formed integrally as a whole, and called extension portion 34', as shown in FIG. 3C.

Figure 7:
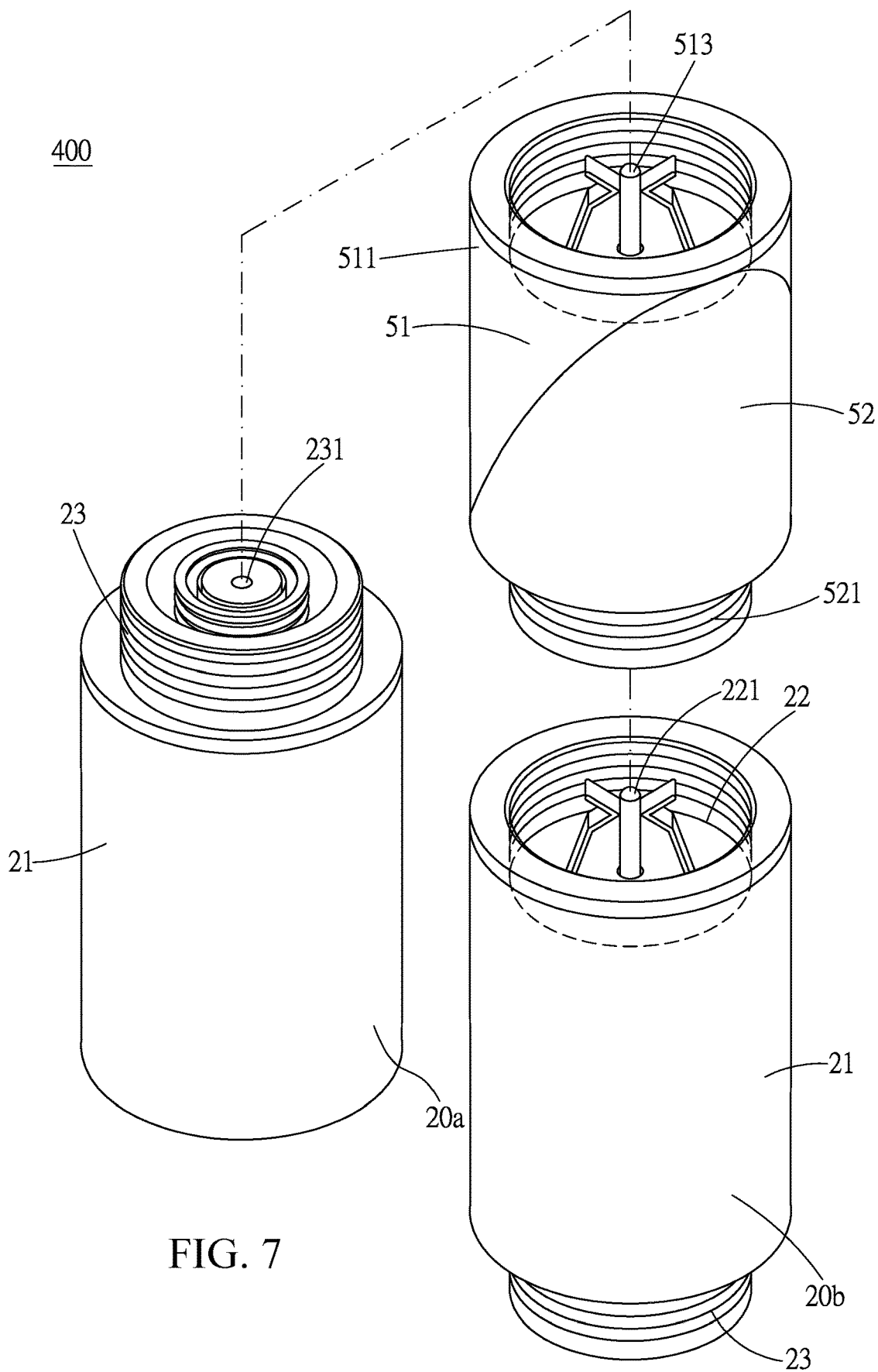
FIG. 7 is a perspective view of a continuable power module of a third embodiment of the disclosure.
Figure 8A:
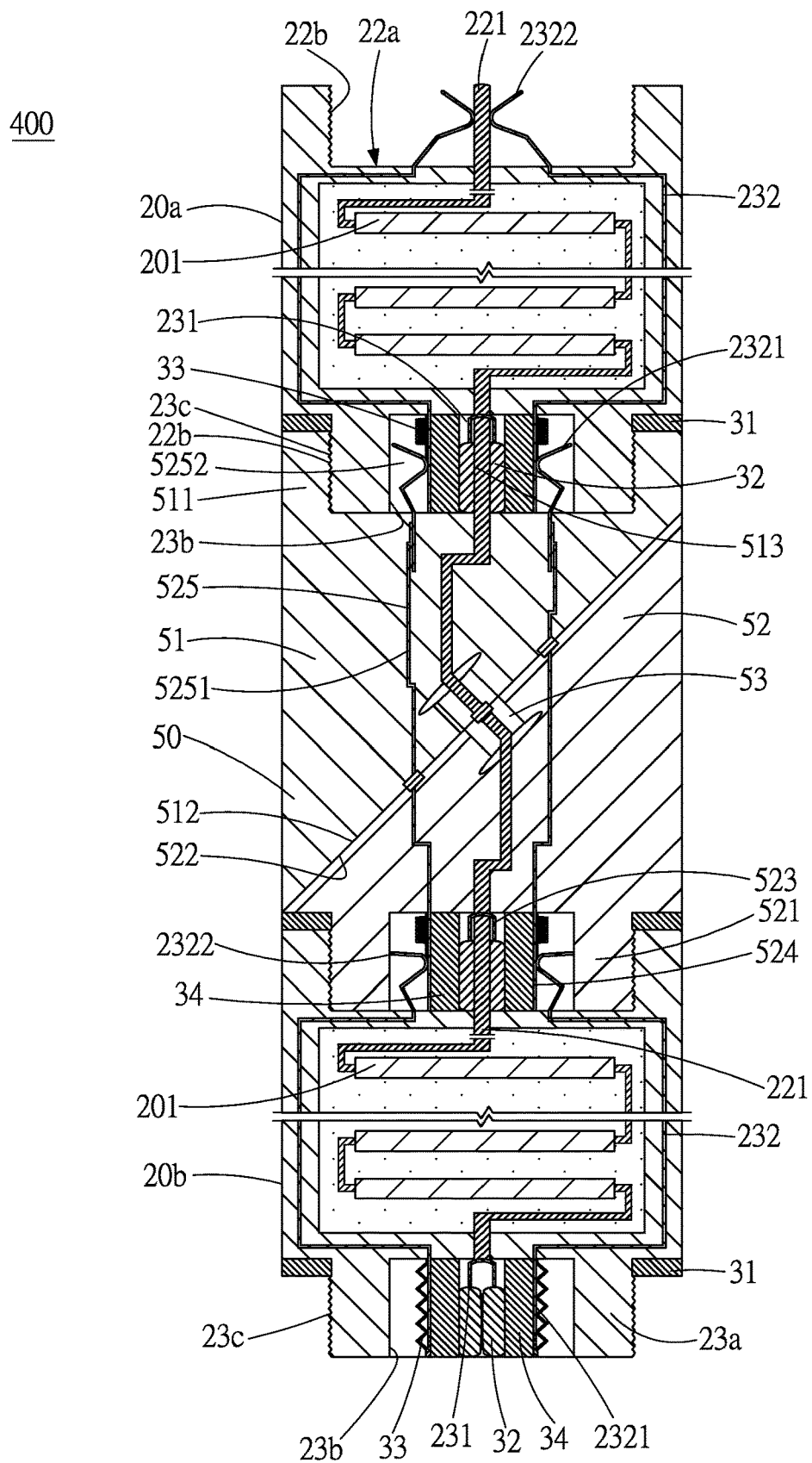
FIG. 8A is a cross-sectional view (1) of the continuable power module of the third embodiment of the disclosure.
Figure 8B:
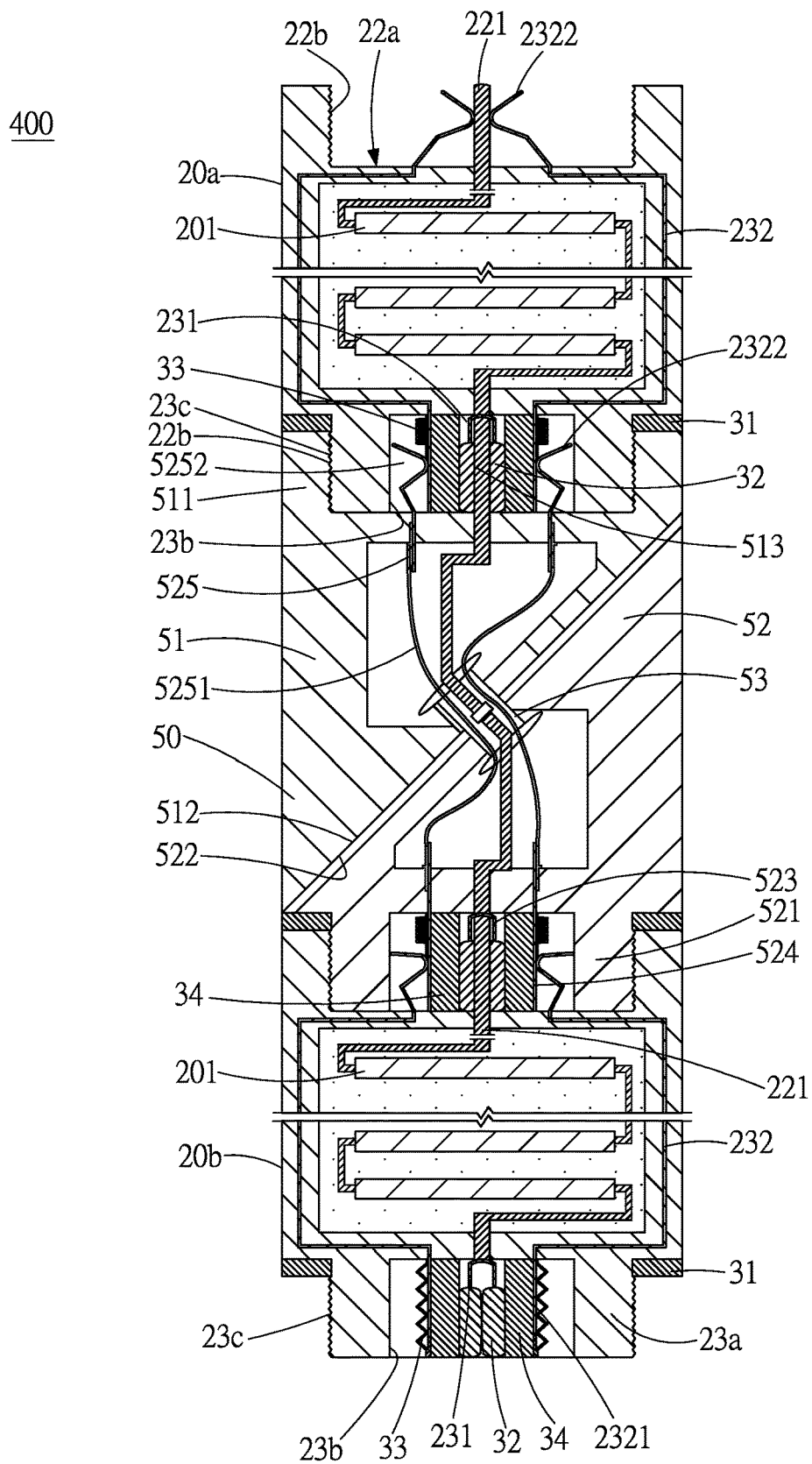
FIG. 8B is a cross-sectional view (2) of the continuable power module of the third embodiment of the disclosure.
Figure 9:
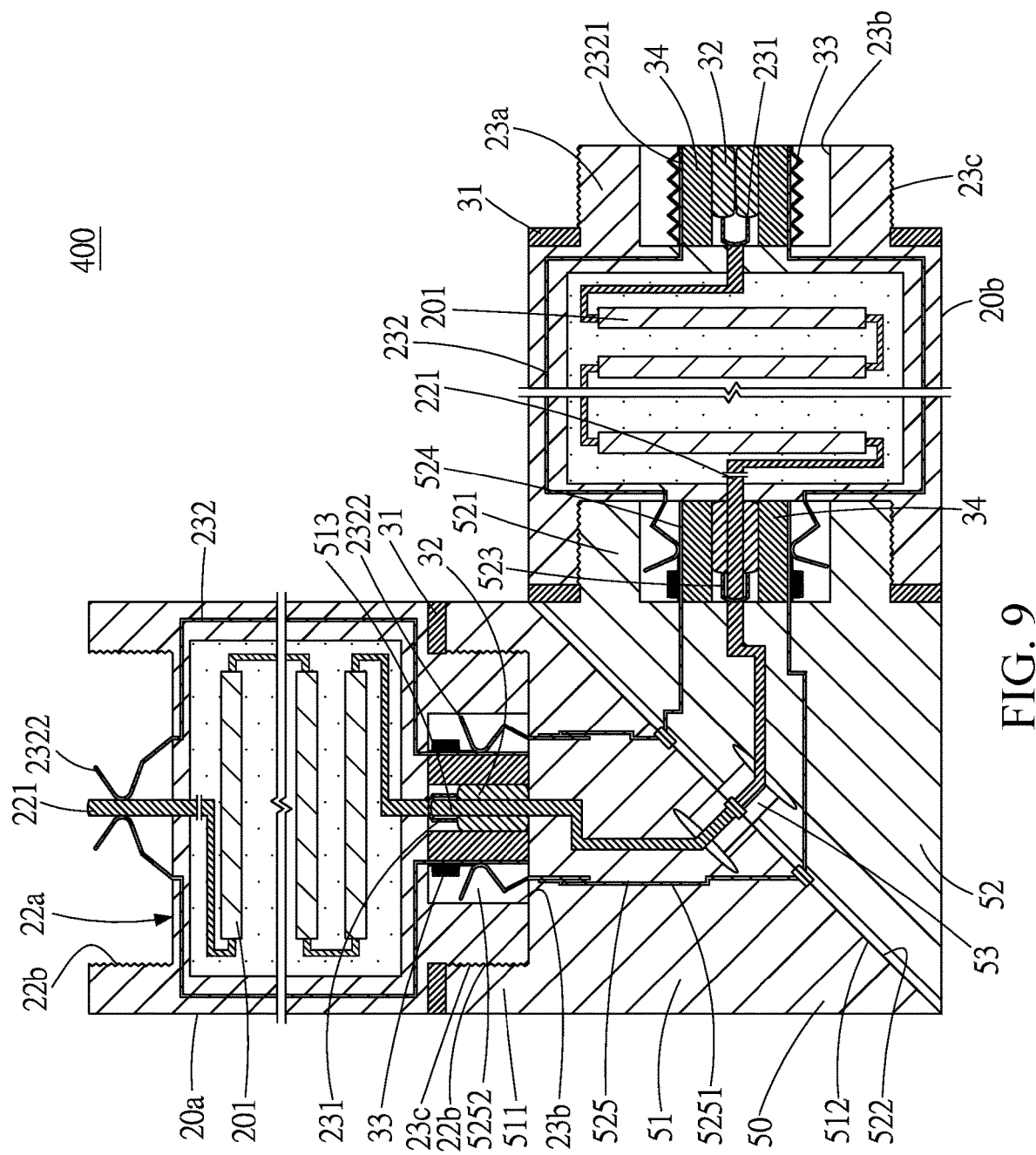
FIG. 9 is an operating schematic view (1) of the continuable power module of the third embodiment of the disclosure.

Please refer to FIGS. 7-10, which are a perspective view, cross-sectional views and operating schematic views of a continuable power module 400 of a third embodiment of the disclosure. The third embodiment is generally similar to the first embodiment or the second embodiment, except that the continuable power module 400 of the third embodiment further has a spindle body 50 disposed between the batteries 20a, 20b (as shown in FIG. 7), or between the battery 20 and the base member (not shown). Please refer to FIG. 8A, in which the spindle body 50 includes a first block body 21, a second block body 52 and a spindle member 53. The first block body 51 includes a first combing end 511, a first rotating end 512 and a first terminal 513. The structure of the first combining end 511 matches that of the continuing end 23 of the battery 20a, such that the first combining end 511 of the first block body 51 is capable of connecting to the continuing end 23 of the battery 20a. The first rotating end 512 is opposite to the first combining end 511 and axially defines an included angle with the spindle body 50. The first terminal 513 is disposed at the first combining end 511, and the structure thereof matches that of the second electrode terminal 231 of the continuing end 23, such that the first terminal 513 of the spindle body 50 is capable of electrically connecting with the second electrode terminal 231 of the battery 20a. The second block body 52 includes a second combining end 521, a second rotating end 522, a second terminal 523, a third terminal 524 and a connecting member 525. The structure of the second combining end 521 matches that of the connecting end 22 of the battery 20b, such that the second combining end 521 of the second block body 52 is capable of connecting to the connecting end 22 of the battery 20b. The second rotating end 522 is opposite to the second combining end 521 and the structure thereof matches with the first rotating end 512. The second terminal 523 is disposed at the second combining end 521 and connected electrically to the first terminal 513, and the structure of the second terminal 523 matches that of the first terminal 513; that is, the structure of the second terminal 523 is substantially the same as that of the second electrode terminal 231 so as to be connected electrically to the first electrode terminal 221. The third terminal 524 is disposed at the second combining end 521, and the structure thereof is substantially the same as that of the secured end 2321 of the conducting terminal 232, so that the free end 2322 of the conducting terminal 232 of the battery 20b can leant against the outer periphery of the third terminal 524. The connecting member 525 includes a fastened end 5251 and a movable end 5252. The fastened end 5251 is securely connected to the third terminal 524, and the movable end 5252 is detachably connected to the first terminal 513, such that the third terminal 524 is connected electrically to the first terminal 513 via the connecting member 525. In other words, the first terminal 513 and the movable end 5252 of the connecting member 525 respectively correspond to the second electrode terminal 231 and the secured end 2321 of the conducting terminal 232, and the second terminal 523 and the third terminal 524 respectively correspond to the first electrode terminal 221 and the free end 2322 of the conducting terminal 232, such that two ends of the spindle body 50 are respectively connected to the battery 20a and the battery 20b; certainly, the number of the spindle body 50 is not limited in the disclosure, and the spindle bodies 50 can be connected to each other according to user's requirements. Substantially, the structure of the spindle body 50 is the same as that of the battery 20 and capable of having the battery core 201. Please refer to FIG. 8A, in which in this embodiment, the first terminal 513, the second terminal 523, the third terminal 524 and the connecting member 525 is disposed out of the spindle member 53, but embodiments of the disclosure are not limited thereto; as shown in FIG. 8B, the spindle member 53 can be a hollowed tube, and conducting wires are applied to the first terminal 513, the second terminal 523, the third terminal 524 and the connecting member 525 for correspondingly inserting into the spindle member 53, such that the electrical connection therebetween are achieved.

Figure 10:
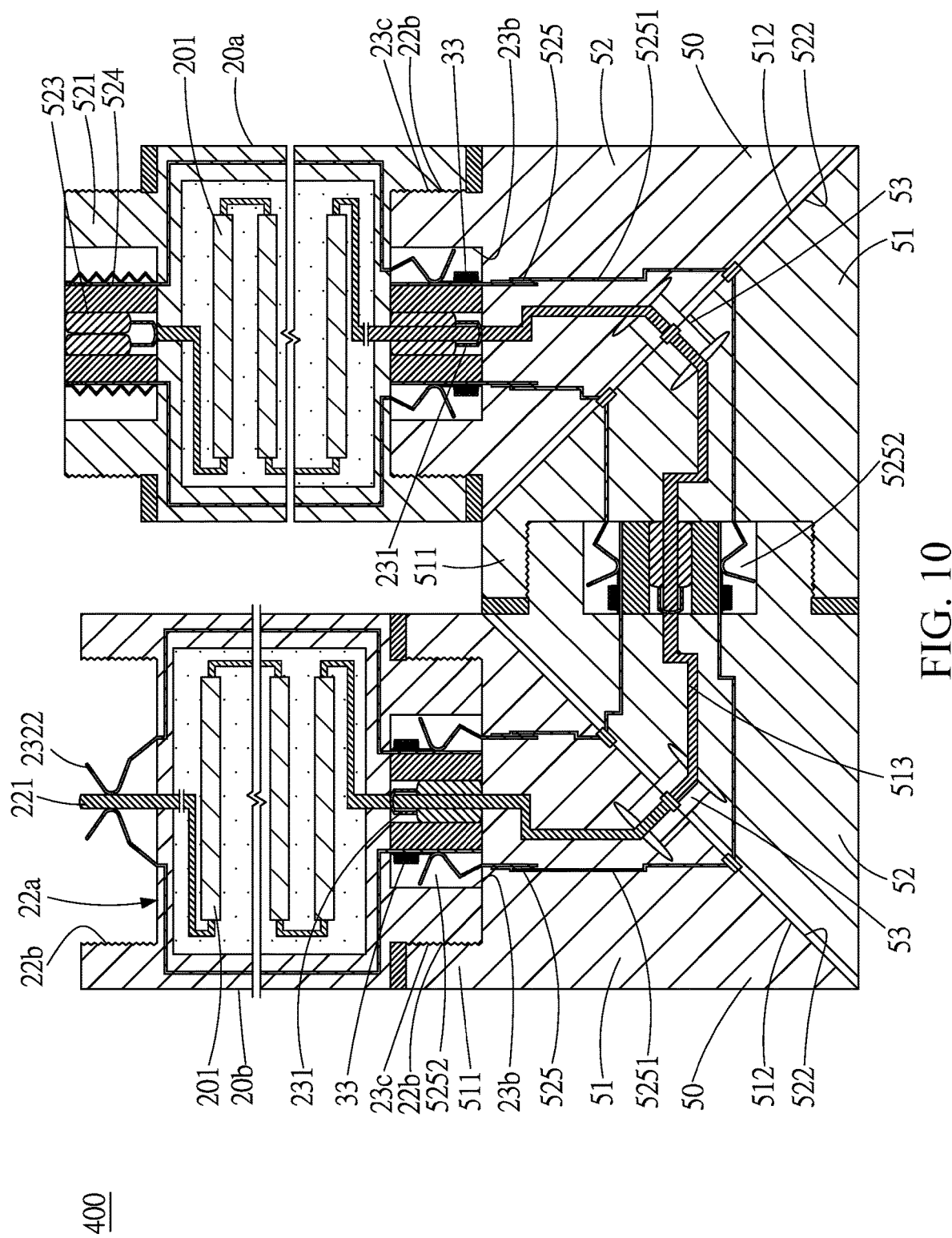
FIG. 10 is an operating schematic view (2) of the continuable power module of the third embodiment of the disclosure.

Please refer to FIGS. 7-10, in which in this embodiment, two ends of the spindle member 53 are respectively connected to the first rotating end 512 and the second rotating end 522, so that the first rotating end 512 is rotated relative to the second rotating end 522 via the spindle member 53, thereby causing the formation of the angled structure between the first combing end 511 of the first block body 51 and the second combining end 521 of the second block body 52. It is understood that, the first terminal 513 is connected electrically to the second terminal 523 via the spindle member 53, so that when the first block body 51 is rotated relative to the second block body 52, the electrical connection between the battery 20a connected electrically to the first terminal 513 and the movable end 5252 of the connecting member 525 and the battery 20b connected electrically to the second terminal 523 and the third terminal 524 is maintained. Based on this, via the spindle body 50, the included angle is defined between the battery 20a connected to the first block body 51 and the battery 20b connected to the second block body 52, thereby the continuable power module 400 of this embodiment is capable of presenting a bent structure. In one embodiment, the included angle is 90 degrees, but embodiments of the disclosure are not limited thereto, the structures and the outlines of the first block body 51, the second block body 52 and the spindle member 53 can be modified to adjust the included angle between the first block body 51 and the second block body 52; for instance, the spindle member 53 can be embodied by an universal joint structure. Additionally, the number of the spindle body 50 can be increased for achieving particular orientational relationship between the battery 20a and the battery 20b; as shown in FIG. 10, the included angle between the battery 20a and the battery 20b is 180 degrees.

Figure 11:
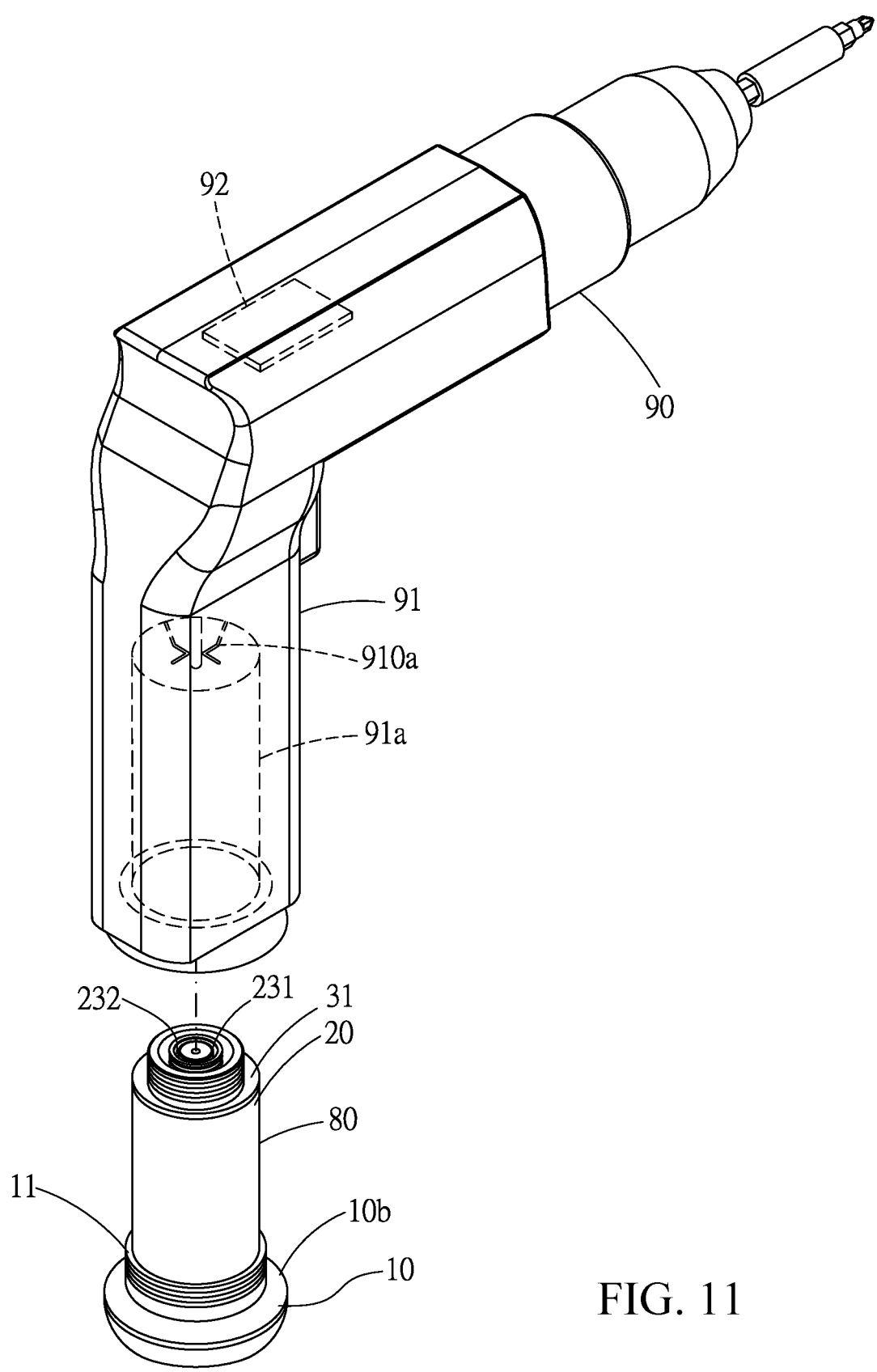
FIG. 11 is an exploded view of an electric device of a fourth embodiment of the disclosure.

Please refer to FIG. 11, which is an exploded view of an electric device 90 of a fourth embodiment of the disclosure. Here, the electric device 90 is an electric drill, but embodiments of the disclosure are not limited thereto. The electric device 90 includes a shell 91, a working circuit 92 and a continuable power module 80. The shell 91 has a battery receiving groove 91a for receiving the continuable power module 80. The battery receiving groove 91a includes a power accepting end 910a, and the structure of the power accepting end 910a matches that of the continuing end 23 of the continuable power module 80. That is, the structure of the power accepting end 910a is substantially the same as that of the connecting end 22 of the continuable power module 80, such that the detail features about the power accepting end 910a are omitted. The power accepting end 910a is connected electrically to the second electrode terminal 231 and the secured end 2321 of the conducting terminal 23 of the battery 20 of the continuable power module 80 in which the battery 20 is at the end of the continuable power module 80. The working circuit 92 is disposed in the shell 91 and connected electrically to the power accepting end 910a for providing the functions of the electric device 90.

Figure 12:
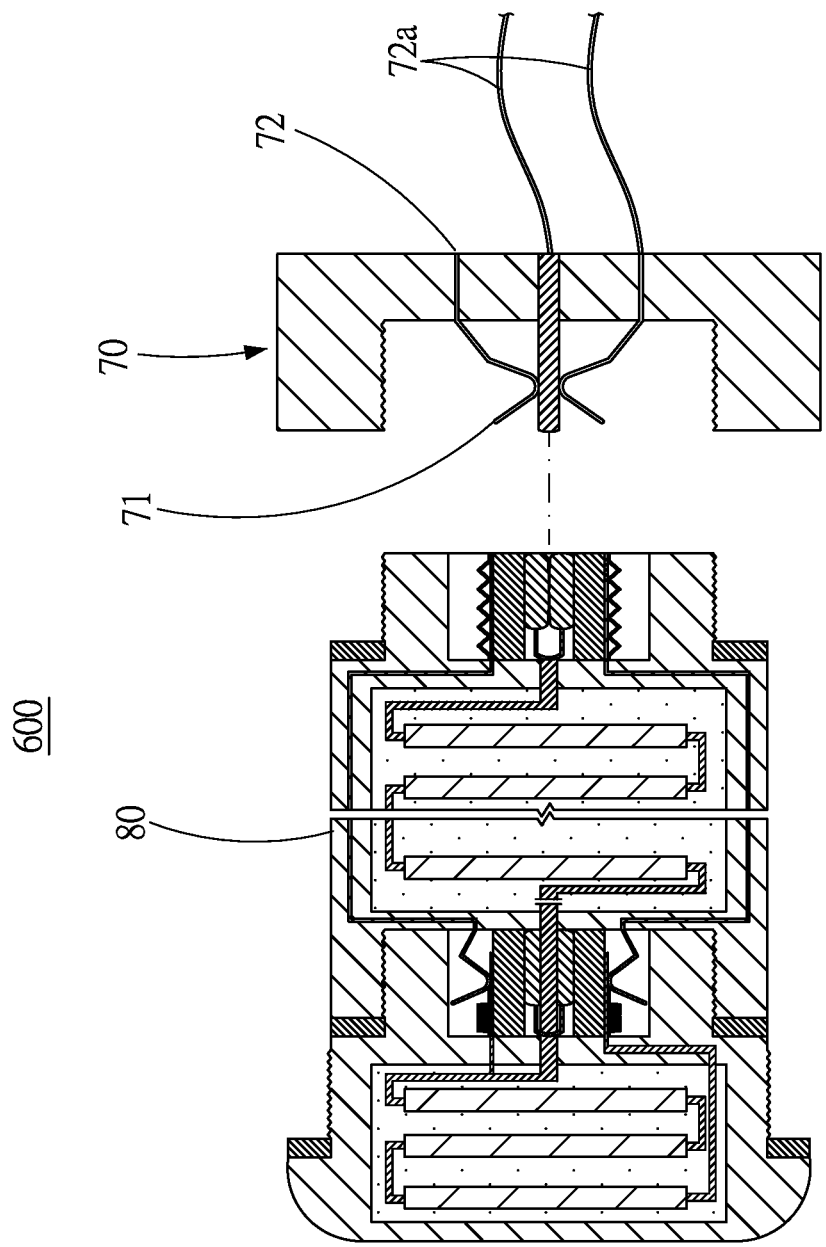
FIG. 12 is an exploded view of a continuable power assembly of a fifth embodiment of the disclosure.

Please refer to FIG. 12, which is an exploded view of a continuable power assembly 600 of a fifth embodiment of the disclosure. The continuable power assembly 600 includes a continuable power module 80 and an adapting member 70. Here, the continuable power module 80 includes a battery 20 and a base member 10, but embodiments of the disclosure are not limited thereto. The adapting member 70 has an adapting end 71 and a power supplying end 72. The structure of the adapting end 71 matches that of the continuing end 23 of the continuable power module 80, so that the adapting end 71 can be connected to the continuing end 23 of the battery 20 of the continuable power module 80 in which the battery 20 is at the end of the continuable power module 80; that is, the structure of the adapting end 71 is substantially the same as that of the connecting end 22 of the continuable power module 80. The power supplying end 72 has a plurality of wires 72a (here, the power supplying end 72 has two wires 72a), capable of electrically connecting with an electric device (not shown). As shown in FIG. 12, the adapting end 71 has a first adapting terminal and a second adapting terminal. The first adapting terminal is correspondingly connected electrically to the second electrode terminal 231 of the continuable power module 80, while the second adapting terminal is correspondingly connected electrically to the secured end 2321 of the conducting terminal 232 of the continuable power module 80. In this case, one of the wires 72a is connected electrically to the first adapting terminal, and the other wire 72a is connected electrically to the second adapting terminal. Based on this, the two wires 72a are respectively connected electrically to the second electrode terminal 231 and the secured end 2321 of the conducting terminal 232 of the battery 20 which is connected to the adapting end 71.

Please refer to FIG. 11 and FIG. 12, in which in addition to connecting electrically with the electric device 90 via the battery receiving groove 91, the continuable power module 80 can be also connected electrically to a power receiving end (not shown), of the electric device 90 via the adapting member 70. For example, the power receiving end can be an USB connecting port, and one ends of the wires 72a are connected to terminal structures which are compatible with the USB connecting port, so that the adapting end 71 is connectable with the USB connecting port.

As above, the electronic devices (e.g., batteries) having the terminal assembly are capable of being connected with each other in a fast and efficient manner. Furthermore, the disclosure provides a continuable power module in which the battery 20 thereof can be connected to each other. The number of the batteries 20 of the continuable power module can be altered so as to adjust the outputted voltage to match with the operating voltage of the electric appliance. Additionally, the disclosure is waterproofed, so that the electric appliances applied thereto can be operated under water or on rainy days, thereby enhancing the usefulness of the electric appliances. Furthermore, via the application of the spindle body 50, the continuable power module is bendable, twistable and foldable, so that the continuable power module can be even received in irregular and small spaces.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electronic device, adapted to be connected to a mating electronic device having a male terminal structure, the male terminal structure having a first terminal member and a free terminal member, wherein the electronic device comprises:
    a device body; and
    a female terminal structure connected to the device body, the female terminal structure
        a female terminal body respectively connected to the device body and the mating electronic device;
        an extension portion protruding from a middle portion of the female terminal body;
        a tunnel recessed from a middle portion of the extension portion;
        a second terminal member disposed at an end portion of the female terminal body and received in the tunnel, wherein the second terminal member has a terminal inserting portion capable of receiving the first terminal member; and
        a secured terminal member disposed at the end portion of the female terminal body, spaced from the second terminal member, and disposed on an outer periphery of the extension portion, wherein the secured terminal member is capable of being in contact with the free terminal member;
    wherein an end portion of the extension portion is substantially flushed with an end portion of the secured terminal member; the second terminal member is separated from the secured terminal member by the extension portion; an end portion of the second terminal member is not flushed with the end portion of the extension portion; the second terminal member is enclosed by the extension portion; one end of the tunnel is closed;
    wherein the female terminal structure further comprises a waterproof elastomer disposed in the tunnel of the extension portion, so that the second terminal member is normally shielded by the waterproof elastomer, wherein the waterproof elastomer has a channel, wherein the terminal inserting portion is capable of receiving the first terminal member through the channel of the waterproof elastomer, and an inner wall of the channel of the waterproof elastomer is capable of enclosing an outer wall of the first terminal member.

2. The electronic device according to claim 1, wherein the female terminal structure further comprises:
    a limiting portion protruding from the middle portion of the female terminal body;
    a void in a middle portion of the limiting portion, wherein the extension portion is located in the void, and one end of the void is closed; and
    a surrounding groove between an inner wall of the limiting portion and an outer wall of the extension portion;

wherein the limiting portion is capable of being mated with a positing portion of the mating electronic device, and the surrounding groove is capable of receiving the free terminal member.

3. The electronic device according to claim 1, wherein the female terminal structure further comprises:
   a positioning portion recessed at the middle portion of the female terminal body, and the extension portion is located in the positioning portion; and
   a peripheral groove between an inner wall of the positioning portion and an outer wall of the extension portion;
   wherein the positioning portion is capable of being mated with a limiting portion of the mating electronic device, and the peripheral groove is capable of receiving the free terminal member.

4. The electronic device according to claim 1, wherein the extension portion is an insulating member disposed between the second terminal member and the secured terminal member.

5. The electronic device according to claim 1, wherein the second terminal member further comprises an abutting wall extending from the terminal inserting portion, the abutting portion has a receiving space, the waterproof elastomer is located in the receiving space and in contact with the abutting wall.

6. The electronic device according to claim 5, wherein a space within the receiving space of the abutting portion is greater than a space within the terminal inserting portion.

7. The electronic device according to claim 1, wherein the female terminal structure further comprises a flexible compressible member fitted over the secured terminal member, so that the secured terminal member is normally shielded by the flexible compressible member, wherein the flexible compressible member is capable of being compressed inwardly by the free terminal member, so that the secured terminal member is exposed and is capable of being in contact with the free terminal member.

8. The electronic device according to claim 1, wherein a bottom surface of the terminal inserting portion is a curved surface.

* * * * *